US010761767B2

(12) United States Patent
Jin et al.

(10) Patent No.: US 10,761,767 B2
(45) Date of Patent: Sep. 1, 2020

(54) COMPUTER SYSTEM AND METHOD FOR CONTROLLING STORAGE APPARATUS THAT HAS REPLICATION DIRECTION FROM FIRST LOGICAL DEVICE (IN FIRST STORAGE) TO SECOND LOGICAL DEVICE (IN SECOND STORAGE) AND FROM SAID SECOND LOGICAL DEVICE TO THIRD LOGICAL DEVICE (IN SAID SECOND STORAGE), WHEREIN SAID REPLICATION DIRECTION IS REVERSED WHEN SECOND COMPUTER TAKES OVER FOR FIRST COMPUTER

(71) Applicant: Hitachi, Ltd., Chiyoda-ku, Tokyo (JP)

(72) Inventors: Azusa Jin, Tokyo (JP); Akira Deguchi, Tokyo (JP); Tomohiro Kawaguchi, Tokyo (JP); Hirotaka Nakagawa, Tokyo (JP); Hiroshi Nasu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/081,539

(22) PCT Filed: Jul. 12, 2016

(86) PCT No.: PCT/JP2016/070545
§ 371 (c)(1),
(2) Date: Aug. 31, 2018

(87) PCT Pub. No.: WO2018/011882
PCT Pub. Date: Jan. 18, 2018

(65) Prior Publication Data
US 2019/0065064 A1 Feb. 28, 2019

(51) Int. Cl.
*G06F 3/06* (2006.01)

(52) U.S. Cl.
CPC .............. *G06F 3/065* (2013.01); *G06F 3/061* (2013.01); *G06F 3/067* (2013.01)

(58) Field of Classification Search
CPC ........................................................ G06F 3/065
See application file for complete search history.

(56) References Cited

U.S. PATENT DOCUMENTS 9,189,341 B1* 11/2015 Natanzon ............ G06F 11/1451
2003/0225950 A1* 12/2003 Paul ........................ G06F 3/00
710/38

(Continued)

FOREIGN PATENT DOCUMENTS

JP 2012-079245 A 4/2012

*Primary Examiner* — William B Partridge
*Assistant Examiner* — Chie Yew
(74) *Attorney, Agent, or Firm* — Procopio, Cory, Hargreaves & Savitch LLP

(57) ABSTRACT

A computer system includes a management computer, a first storage apparatus, and a second storage apparatus. A first logical device of the first storage apparatus and a second logical device of the second storage apparatus constitute a remote copy pair. The second logical device and a third logical device of the second storage apparatus constitute a copy pair. The second logical device and the third logical device have virtual IDs to be recognized by an issuer of an I/O request. The second storage apparatus interchanges the virtual IDs of the third logical device and the second logical device with reception of a command from the management computer as a trigger during processing of the I/O request from the issuer of the I/O request to the third logical device, thereby switching an access destination of the issuer of the I/O request from the third logical device to the second logical device.

8 Claims, 16 Drawing Sheets

(56) References Cited

U.S. PATENT DOCUMENTS

| | | | |
|---|---|---|---|
| 2004/0024975 A1* | 2/2004 | Morishita et al. | G06F 12/00 711/147 |
| 2006/0031594 A1* | 2/2006 | Kodama | G06F 11/2058 710/5 |
| 2006/0236056 A1* | 10/2006 | Nagata | G06F 3/061 711/165 |
| 2007/0050574 A1* | 3/2007 | Kaiya et al. | G06F 12/16 711/162 |
| 2007/0239944 A1* | 10/2007 | Rupanagunta et al. | G06F 12/06 711/147 |
| 2007/0266215 A1* | 11/2007 | Okada | G06F 3/0607 711/165 |
| 2008/0019316 A1* | 1/2008 | Imai | H04Q 7/00 370/331 |
| 2012/0011394 A1* | 1/2012 | Maki | G06F 11/2028 714/6.3 |
| 2012/0089804 A1 | 4/2012 | Ikegaya et al. | |
| 2012/0278280 A1* | 11/2012 | Broido | G06F 11/2069 707/610 |
| 2013/0152086 A1* | 6/2013 | Yoo et al. | G06F 9/455 718/1 |
| 2014/0075143 A1* | 3/2014 | Matsuya et al. | G06F 12/02 711/170 |
| 2014/0101279 A1* | 4/2014 | Nagami et al. | H04L 67/1097 709/213 |
| 2015/0286538 A1* | 10/2015 | Brown | G06F 11/1451 714/19 |
| 2016/0004616 A1* | 1/2016 | Narita et al. | G06F 11/20 |
| 2018/0059946 A1* | 3/2018 | Kunii | G06F 3/0604 |

* cited by examiner

FIG. 9

SNAPSHOT PAIR MANAGEMENT TABLE (603)

| PAIR ID (901) | SNAPSHOT CREATION SOURCE LDEV ID (902) | SNAPSHOT VOL LDEV ID (903) | PAIR STATE (904) |
|---|---|---|---|
| 1-1 | 2222 | 3333 | Suspend | (911)
| ... |  | ... | ... |
| ... | ... | ... | ... |

FIG. 10

REMOTE COPY PAIR MANAGEMENT TABLE (604)

| PAIR ID (1001) | LDEV ID (1002) | PAIR ATTRIBUTE (1003) | PAIR PARTNER LDEV ID (1004) | PAIR PARTNER STORAGE APPARATUS ID (1005) |
|---|---|---|---|---|
| 1 | 2222 | SVOL | 1111 | ST01 | (1011)
| ... | ... | ... | ... | ... |

FIG. 16

1600 VIRTUAL LDEV MANAGEMENT TABLE

| PORT ID (1601) | LUN (1602) | VIRTUAL LDEV ID (1603) | I/O QUEUING FLAG (1604) |
|---|---|---|---|
| 00 | 00 | 1000 | OFF |
|  |  | ... | ... |
|  |  | ... | ... |
| 01 | 01 | 2000 | OFF |
|  |  | 3000 | OFF |
|  |  | ... | ... |
|  | ... | ... | ... |
| ... | ... | ... | ... |

(row 1611)

FIG. 17

1700 VIRTUAL LDEV – ACTUAL LDEV MANAGEMENT TABLE

| VIRTUAL LDEV ID (1701) | LDEV ID (1702) | LDEV START ADDRESS (1703) | LDEV END ADDRESS (1704) |
|---|---|---|---|
| 2000 | 2222 | 020000 | 020999 |
| 3000 | 3333 | 030000 | 030999 |
| ... | ... | ... | ... |

(row 1711)

COMPUTER SYSTEM AND METHOD FOR CONTROLLING STORAGE APPARATUS THAT HAS REPLICATION DIRECTION FROM FIRST LOGICAL DEVICE (IN FIRST STORAGE) TO SECOND LOGICAL DEVICE (IN SECOND STORAGE) AND FROM SAID SECOND LOGICAL DEVICE TO THIRD LOGICAL DEVICE (IN SAID SECOND STORAGE), WHEREIN SAID REPLICATION DIRECTION IS REVERSED WHEN SECOND COMPUTER TAKES OVER FOR FIRST COMPUTER

CROSS-REFERENCE TO RELATED APPLICATIONS

This application is a U.S. National Stage entry of PCT Application No: PCT/JP2016/070545 filed Jul. 12, 2016, the contents of which are incorporated herein by reference.

TECHNICAL FIELD

The present invention relates to a computer system and a method for controlling a storage apparatus.

BACKGROUND ART

Along with the progress of virtualization techniques, it becomes possible to run a plurality of virtual machines on one physical host computer, and to perform failover in the event of a system failure, by causing the processing that has been executed by a virtual machine to be taken over by another virtual machine on the remote host computer.

Virtual machine information such as images and use data of the virtual machines can be stored in a logical device of a storage apparatus. In such a configuration, along with execution of failover of the virtual machine, failover is performed from a logical device of a storage apparatus of a primary site where the virtual machine information has been stored to a logical device of a storage apparatus of a secondary site such as a remote site, thereby interchanging the primary and secondary logical devices. Thus, the unit of the logical device to be associated with the virtual machine becomes important.

PTL 1 discloses a method of dividing one logical device of a storage apparatus into a plurality of virtual volumes on a host computer and storing data used by a virtual machine for each virtual volume.

CITATION LIST

Patent Literature

PTL 1: JP 2012-79245 A

SUMMARY OF INVENTION

Technical Problem

A conglomerate LUN structure has been proposed as a scheme that allocates logical devices to virtual machines. In this scheme, a plurality of the logical devices of a storage apparatus is grouped into a plurality of LUN conglomerates, a logical path is set to an administrative logical unit (ALU) playing a role of a gateway in the logical conglomerate, an input/output (I/O) command from a host computer side is issued while designating an identifier of a subsidiary logical unit (SLU) other than the ALU in the logical conglomerate, and the storage apparatus distributes I/O processing to the SLU designated by the received command. As a result, one or a plurality of the SLUs is allocated to one virtual server on the host computer so that it is possible to set the logical devices of the storage apparatus in units of virtual servers, and it is possible to perform failover in units of the SLUs.

Examples of the failover include an official failover that is automatically performed with occurrence of an actual failure or the like as a trigger, and a test failover that is executed systematically for the purpose of verification of failover or the like.

In the test failover, a snapshot acquired from a logical device of a remote copy destination is used in some cases so as not to affect work in production running or a remote copy configuration. Further, there is a case where the production work operation is continued in a virtual machine in the middle of executing the test failover in order to use snapshot data at a predetermined point in time. For example, it is a case where a failure occurs in a virtual machine of a primary site in the middle of executing the test failover by a virtual machine of a secondary site using a snapshot.

At this time, the snapshot of the secondary site connected to the virtual machine in the middle of executing the test failover is set to be handled as the latest data. Further, the snapshot set to be handled as the latest data has no remote copy configuration with the logical device of the primary site, and thus, resumption of remote copy in a reverse direction from the snapshot of the secondary site as a failover destination to the logical device of the primary site is requested in order to maintain the remote copy configuration.

There is a related art in which data of logical devices are synchronized in a reverse direction from a secondary site to a primary site with respect to a pair of the logical devices which has performed remote copy from the primary site to the secondary site. However, a remote copy pair is not configured between a snapshot of the secondary site and the logical device of the primary site, and it is necessary to newly constitute the remote copy pair.

When constituting a new remote copy pair, it is necessary to copy the data of the entire volume area from the secondary site to the primary site, so that there occurs a problem that it takes time to reconfigure the remote copy.

An object of the present invention is to perform remote copy in a reverse direction from a snapshot of a secondary site to a logical device of a primary site, which do not constitute a remote copy pair, at high speed without generating the entire area copy.

Solution to Problem

The present invention relates to a computer system that includes a management computer, a first storage apparatus, and a second storage apparatus. A first logical device of the first storage apparatus and a second logical device of the second storage apparatus constitute a remote copy pair. The second logical device and a third logical device of the second storage apparatus constitute a copy pair. The second logical device and the third logical device have virtual IDs to be recognized by an issuer of an I/O request. The second storage apparatus interchanges the virtual IDs of the third logical device and the second logical device with reception of a predetermined command from the management computer as a trigger during processing of the I/O request from the issuer of the I/O request to the third logical device, thereby switching an access destination of the issuer of the I/O request from the third logical device to the second logical device.

Advantageous Effects of Invention

According to the present invention, it is possible to speed up the resumption of remote copy in the reverse direction with the snapshot (third logical device) of the remote copy destination volume (second logical device) as a copy source.

BRIEF DESCRIPTION OF DRAWINGS

FIG. 9 is a table illustrating the first embodiment and the second embodiment of the present invention and illustrating an example of a snapshot pair management table.

FIG. 10 is a table illustrating the first embodiment and the second embodiment of the present invention and illustrating an example of a remote copy pair management table.

FIG. 16 is a diagram illustrating the second embodiment of the present invention and illustrating an example of a virtual LDEV management table.

FIG. 17 is a diagram illustrating the second embodiment of the present invention and illustrating an example of a virtual LDEV-actual LDEV management table.

DESCRIPTION OF EMBODIMENTS

Hereinafter, embodiments of the present invention will be described with reference to the drawings. In the following drawings, the same reference signs will be attached to the same parts. However, the present invention is not limited by the embodiments, and various application examples conforming to an idea of the present invention are included in a technical scope of the present invention. In addition, each component may be plural or singular unless specifically limited.

Incidentally, various kinds of information will be sometimes described with an expression, "xxx table" in the following description, but the various kinds of information may be expressed with a data structure other than the table. In order to indicate that the information is not dependent on the data structure "xxx table" can be called "xxx information".

In addition, there is a case where processing is described with a "program" as a subject in the following description, but the subject of the processing may be a processor since the program is executed by the processor (for example, a central processing unit (CPU)) to perform the prescribed processing appropriately using a storage resource (for example, a memory) and a communication interface device (for example, a communication port). The processor may have dedicated hardware in addition to the CPU. The computer program may be installed in each computer from a program source. For example, the program source may be a program distribution server or a storage medium.

In addition, each element can be identified based on an ID, a number, or the like, but other kinds of identification information such as a name may be used as long as the information is identifiable.

First Embodiment

Figure 1:
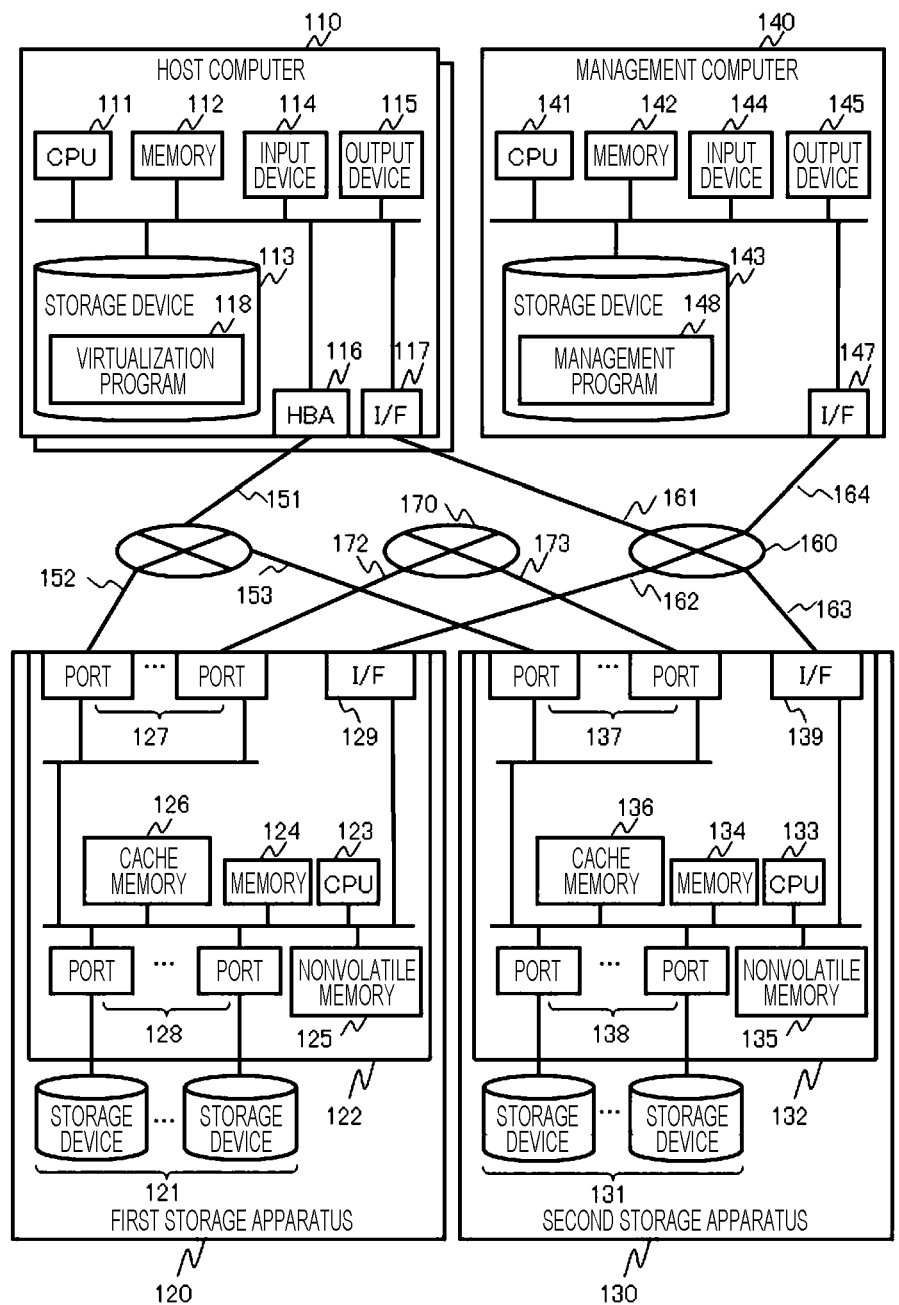
FIG. 1 is a block diagram illustrating a first embodiment and a second embodiment of the present invention and illustrating an example of a physical configuration of a computer system.

A first embodiment of the present invention will be described with reference to FIGS. 1 to 13. FIG. 1 is a block diagram illustrating a physical configuration of a computer system according to the first embodiment and a second embodiment.

For example, this computer system is configured to include one or a plurality of host computers 110, one or a plurality of first storage apparatuses 120, one or a plurality of second storage apparatuses 130, and one or a plurality of management computers 140.

Figure 2:
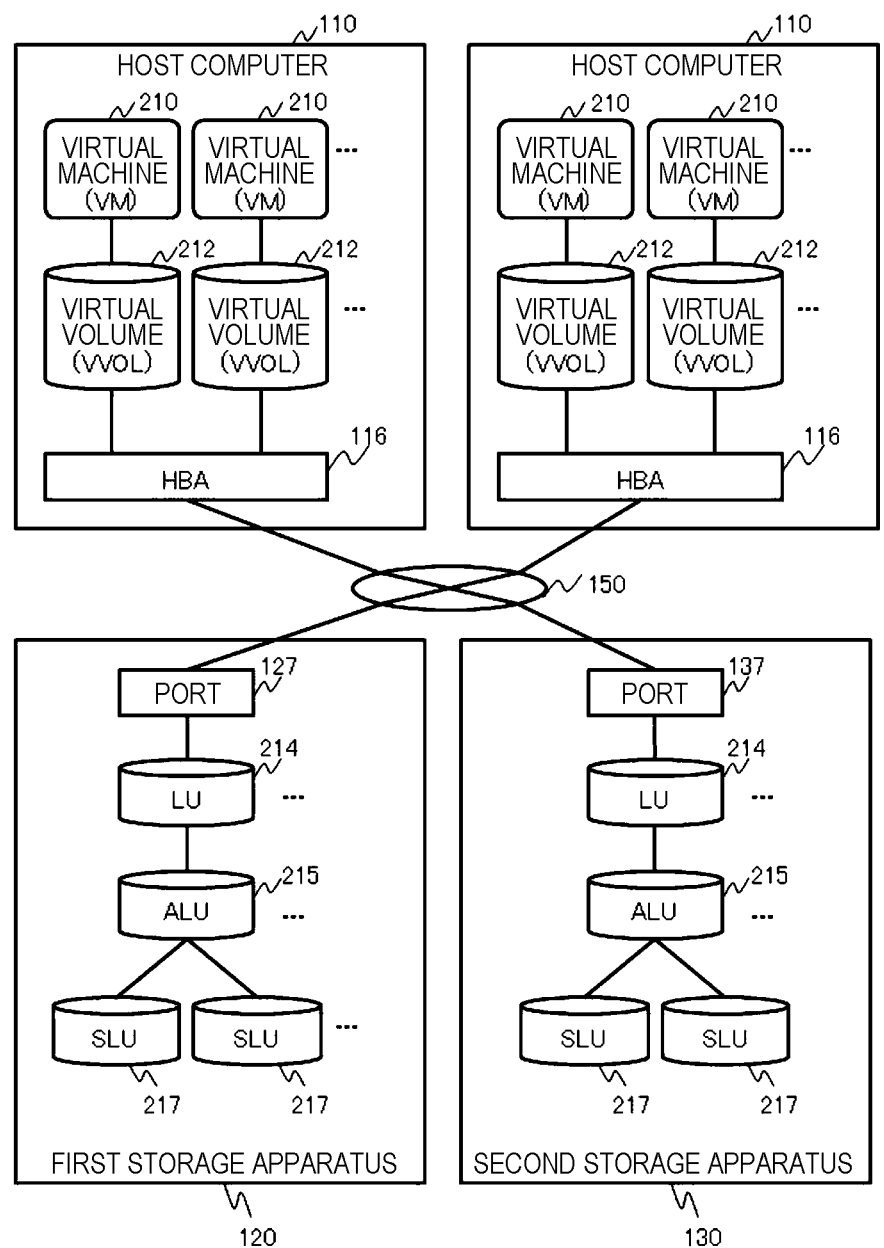
FIG. 2 is a block diagram illustrating the first embodiment of the present invention and illustrating an example of a logical configuration of the computer system.

The host computer 110, the first storage apparatus 120, and the second storage apparatus 130 are connected by communication lines 151, 152, and 153 via, for example, a storage area network (SAN) 150 (shown in FIG. 2).

The host computer 110, the first storage apparatus 120, the second storage apparatus 130, and the management computer 140 are connected by communication lines 161, 162, 163, and 164, for example, via a management network 160.

The first storage apparatus 120 and the second storage apparatus 130 are connected by communication lines 172 and 173, for example, via a wide area network (WAN) 170.

Incidentally, the above-described communication lines 151, 152, 153, 161, 162, 163, 164, 172, and 173 are configured as wired lines such as metal cables and optical fiber cables, for example, but the respective elements may be wirelessly connected. In such a case, these communication lines are omitted. In addition, each of these communication lines is not limited to one but may be plural.

In addition, the SAN 150, the management network 160, and the WAN 170 may be a common network. These networks are communication networks, and can be configured using, for example, a SAN, a WAN, a local area network (LAN), or the like.

The host computer 110 is, for example, a computer device configured to include a CPU 111, a memory 112, a storage device 113, an input device 114, an output device 115, a host bus adapter (HBA) 116, and an interface control unit 117, and is constituted by, for example, a personal computer, a work station, a main frame, and the like.

The CPU 111 is a processor that controls the entire host computer 110, and reads various programs stored in the storage device 113 on the memory 112 to execute the read programs.

The memory 112 is not only used to store the various programs read from the storage device 113 by the CPU 111 at the time of activating of the host computer 110 but also used as a work memory of the CPU 111.

The storage device 113 is configured using, for example, a hard disk drive (HDD) or a solid state drive (SSD), and is used to store and hold various programs and control data.

The input device 114 is configured using, for example, a keyboard switch, a pointing device, a microphone, or the like. The output device 115 is configured using, for example, a liquid crystal display or the like.

The host bus adapter 116 performs protocol control at the time of communication with the storage apparatuses 120 and 130. As the HBA 116 executes such a protocol control function, data and a command are transmitted and received between the host computer 110 and the storage apparatuses 120 and 130 and between the first storage apparatus 120 and the second storage apparatus 130.

The interface control unit 117 is an adapter configured to connect the host computer 110 to the management network 160.

A virtualization program 118 is a program configured to virtualize resources of the CPU 111, the memory 112, the storage device 113, the input device 114, the output device 115, the HBA 116, and the interface control unit 117 of the host computer 110 and allocate and manage the virtualized resources in units of virtual machines, and is executed by the CPU 111 by being read from the storage device 113 to the memory 112.

Since the first storage apparatus 120 and the second storage apparatus 130 have the same configuration in the present embodiment, the description regarding the second storage apparatus 130 will be omitted.

The first storage apparatus 120 includes a plurality of storage devices 121 and a control unit 122 which controls input and output of data with respect to the storage device 121.

The storage device 121 is configured using an expensive disk such as a SCSI disk formed using an HDD or an SSD, an inexpensive disk such as a serial at attachment (SATA) disk and an optical disk, or the like. The plurality of storage devices 121 constitutes one redundant-array-of-inexpensive-disks (RAID) group, and one or a plurality of logical units is set on a physical storage area provided by one or a plurality of the RAID groups. Then, data from the host computer 110 is stored in the logical unit in units of blocks each having a predetermined size.

The control unit 122 is configured to include a CPU 123, a main memory 124, a nonvolatile memory 125, a cache memory 126, a plurality of host-side ports 127, a plurality of storage-device-side ports 128, and an interface control unit 129.

The CPU 123 is a processor that controls the entire first storage apparatus 120, and reads various programs stored in the storage device 121 on the main memory 124 to execute the read programs.

The main memory 124 is not only used to store various programs read from the nonvolatile memory 125 by the CPU 123 at the time of activating of the first storage apparatus 120 but also used as a work memory of the CPU 123.

The nonvolatile memory 125 is used to store and hold various programs and control data. The cache memory 126 is mainly used as a storage area of a queue and the like which temporarily stores data transmitted and received between the host computer 110 and the storage device 121.

The host-side port 127 is an adapter configured to connect the first storage apparatus 120 to the SAN 150 or the WAN 170. The storage-device-side port 128 is an adapter configured to connect the control unit 122 to the storage device 121. The interface control unit 129 is an adapter configured to connect the first storage apparatus 120 to the management network 160.

The management computer 140 is a computer device configured to manage the host computer 110, the first storage apparatus 120, and the second storage apparatus 130, and is configured to include, for example, a CPU 141, a memory 142, a storage device 143, an input device 144, an output device 145, and an interface control unit 147.

The CPU 141 is a processor that controls the entire management computer 140, and reads various programs stored in the storage device 143 on the memory 142 to execute the read programs. The memory 142 is not only used to store the various programs read from the storage device 143 by the CPU 141 at the time of activating of the management computer 140 but also used as a work memory of the CPU 141.

The storage device 143 is configured using, for example, an HDD or an SSD, and is used to store and hold various programs and control data. The input device 144 is configured using, for example, a keyboard switch, a pointing device, a microphone, or the like. The output device 145 is configured using, for example, a liquid crystal display or the like.

The interface control unit 147 is an adapter configured to connect the management computer 140 to the management network 160. A storage management program 148 can transmit an operation request of a logical device to the control unit 122 of the first storage apparatus 120, and control unit 132 of the second storage apparatus 130, via the management network 160. The storage management program 148 is read from the storage device 143 to the memory 142 by the CPU 141 and executed.

FIG. 2 is a block diagram illustrating a logical configuration of the computer system according to the first embodiment. A storage apparatus in the present embodiment is not limited to either the first storage apparatus 120 or the second storage apparatus 130, and thus, is described as the storage apparatus 120 or 130.

A virtual machine 210 is a virtual computer which is virtualized by the virtualization program 118 and to which some of computer resources of the host computer 110 are allocated.

A virtual volume (VVOL) 212 is a logical device provided to the virtual machine 210 by the virtualization program 118, and is the unit in which the host computer 110 recognizes the SLU 217 (to be described later) of the storage apparatuses 120 and 130 as the logical device.

The virtualization program 118 reads an I/O request (read, write, or the like) from the virtual machine 210 to the VVOL 212 and issues an I/O command to the storage apparatuses 120 and 130. The VVOL 212 and the SLU 217 are associated with each other via an LU 214 and an ALU 215 which will be described later.

The logical unit (LU) 214 is a unit obtained by dividing or aggregating storage areas provided by the storage device 121 in logical units.

The ALU 215 is a logical device which is recognized as a representative from the host computer 110 among the logical devices of the storage apparatuses 120 and 130. The ALU 215 is managed in association with the SLU 217 of the storage apparatus 130.

The SLU 217 is a logical device managed by an SLU ID that is an ID recognized by the host by virtualizing the logical devices of the storage apparatuses 120 and 130, and is managed in association with the ALU 215. The I/O command from the host computer 110 to the storage apparatuses 120 and 130 is issued while designating an identifier of the SLU 217.

Figure 3:
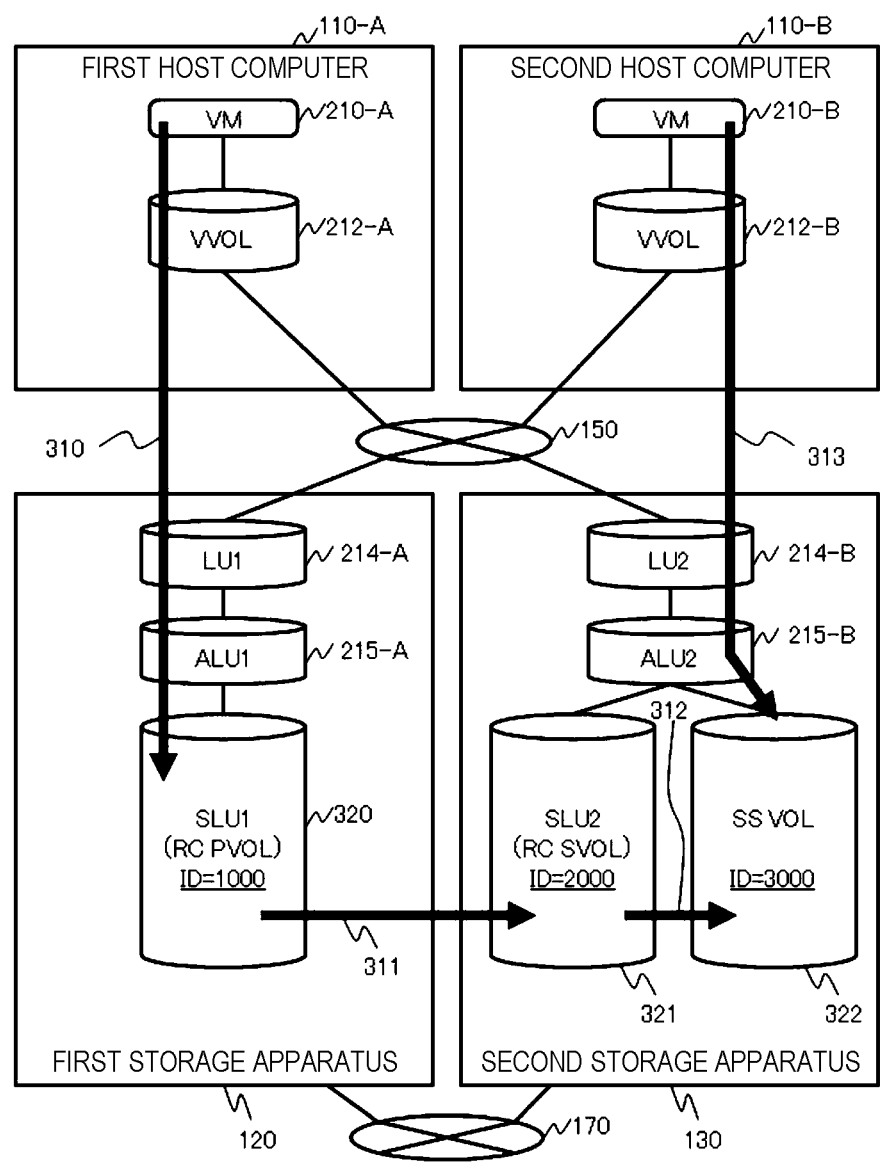
FIG. 3 is a diagram illustrating the first embodiment of the present invention and illustrating an example of I/O processing at the time of execution of test failover.

FIG. 3 is a schematic diagram illustrating an example of I/O processing during execution of test failover according to the first embodiment.

Incidentally, those attached with "-A" and "-B" in the drawing are the same as those described without being attached with "-A" and "-B" in FIG. 2, but are described to be distinguished for the sake of the description.

An I/O path 310 represents an example of processing an I/O request issued from a virtual machine 210-A. The I/O request issued from the virtual machine 210-A of a first host computer 110-A to a VVOL 212-A is transmitted to the first storage apparatus 120 via the SAN 150.

At this time, the first storage apparatus 120 in which a LU 1 (214-A) associated with the VVOL 212-A of the first host computer 110-A is defined receives this I/O request, and performs I/O processing on an SLU 1 (320) which is an SLU associated with an ALU 1 (215-A), associated with the LU 1 (214-A), and is associated with the VVOL 212-A.

An attribute of this SLU 1 (320) is a remote copy primary volume (RC PVOL).

A remote copy path 311 represents an example of remote copy to copy data of the SLU 1 (320) of the first storage apparatus 120 to an SLU 2 (321) of the second storage apparatus 130.

An attribute of the SLU 2 (321) of the second storage apparatus 130 is a remote copy secondary volume (RC SVOL).

An update content of the SLU 1 (320) of the first storage apparatus 120 is transferred from the first storage apparatus 120 to the second storage apparatus 130, and is reflected on the SLU 2 (321) of the second storage apparatus 130.

A snapshot creation path 312 is an example of copying data of the SLU 2 (321) of the second storage apparatus 130 to a snapshot volume (SS VOL) 322 which is another SLU in the second storage apparatus 130.

The data of the SLU 2 (321) of the second storage apparatus 130 is copied to the SS VOL 322 at a preset timing such as every fixed time. At this time, it is possible to designate a different snapshot VOL for each copy.

Here, there is a case where test failover of the virtual machine 210-A is performed using data of the SS VOL 322 without stopping the processing of the I/O path 310 and the remote copy path 311 from the virtual machine 210-A under production running to the SLU 1 (320).

As a configuration example for implementing such a method, a description will be given with a configuration in which a virtual machine 210-B of a second host computer 110-B is designated as a failover destination, and the SS VOL 322 of the second storage apparatus 130 associated with a VVOL 212-B is provided to the virtual machine 210-B.

An I/O path 313 is an I/O path generated with reception of a "test failover execution command" instructing start of test failover by the second host computer 110-B from the management computer 140, as a trigger, and represents an example of processing an I/O request issued from the virtual machine 210-B.

The I/O request issued from the virtual machine 210-B of the second host computer 110-B to the VVOL 212-B is transmitted to the second storage apparatus 130 via the SAN 150.

At this time, the second storage apparatus 130 in which a LU 2 (214-B) associated with the VVOL 212-B of the second host computer 110-B is defined receives this I/O request, and performs I/O processing on the SS VOL 322 which is the SLU associated with an ALU 2 (215-B), associated with the LU 2 (214-B), and associated with the VVOL 212-B.

Figure 4:
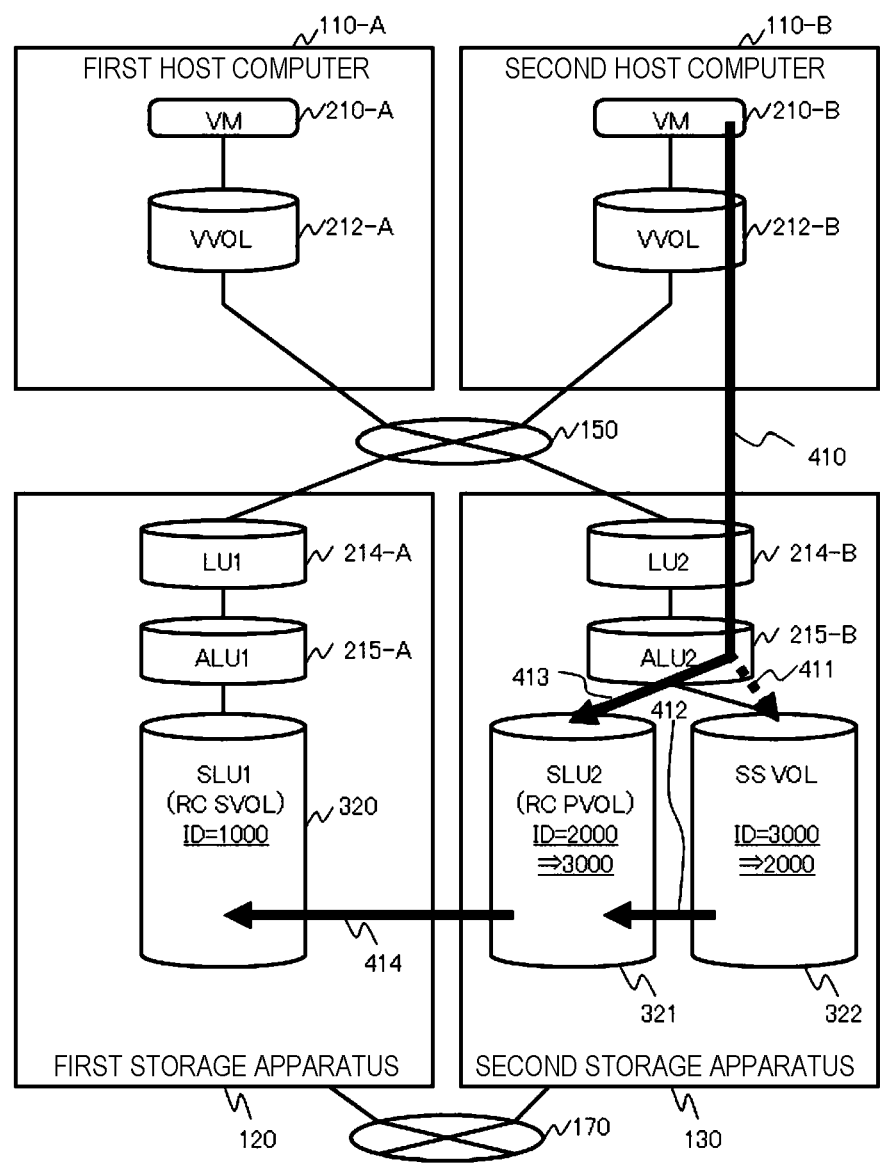
FIG. 4 is a diagram illustrating the first embodiment of the present invention and illustrating an example of I/O processing during remote copy reconfiguration.

FIG. 4 is a schematic diagram of I/O processing at the time of switching a remote copy direction according to the first embodiment.

There is a case where it is desired to operate the I/O path 313 as a positive site instead of the I/O path 310 during execution of the test failover as exemplified in FIG. 3. For example, it corresponds to a case where a failure occurs in the first host computer 110-A. At this time, redundancy by remote copy from the second storage apparatus 130 to the first storage apparatus 120 is required instead of the remote copy path 311.

A process in which the second storage apparatus 130 changes an I/O path and a remote copy path according to an instruction from the management computer 140 will be described. A combined path of an I/O path 410 and an I/O path 411 represents the same path as the I/O path 313 of FIG. 3.

A snapshot restoration path 412 represents a process executed with reception of a "remote copy resumption preparation command" instructing transition to an official failover state by the second storage apparatus 130 from the management computer 140 as a trigger, the process of copying the data of the SS VOL 322 created from the SLU 2 (321) of the second storage apparatus 130 to the SLU 2 (321) again.

Here, for example, when there is an updated area in the SS VOL 322 according to the I/O request issued from the virtual machine 210-B, it is possible to shorten a copy time by copying only the area where the update has occurred to the SLU 2 (321).

An I/O path 413 represents a process at the time of changing the SLU that processes the I/O request from the virtual machine 210-B from the SS VOL 322 to the SLU 2 (321). The change from the I/O path 411 to the I/O path 413 is performed by changing an ID of the SLU 2 (321) from 2000 to 3000 and changing an ID of the SS VOL 322 from 3000 to 2000 (details will be described later with reference to FIG. 12).

A remote copy path 414 is a copy path of data set with reception of a "remote copy reconfiguration command"

instructing resumption of remote copy in the reverse direction by the second storage apparatus 130 from the management computer 140 as a trigger, and represents an example of a remote copy process of copying the data of the SLU 2 (321) after restoring the snapshot to the SLU 1 (320) of the first storage apparatus 120.

This resumption of remote copy is performed after changing the attribute of the SLU 2 (321) from the RC SVOL to the RC PVOL and changing the attribute of the SLU 1 (320) from the RC PVOL to the RC SVOL (details will be described later with reference to FIG. 13).

After changing the attribute of the volume, an update content of the SLU 2 (321) is transferred from the second storage apparatus 130 to the first storage apparatus 120 and reflected on the SLU 1 (320).

Figure 5:
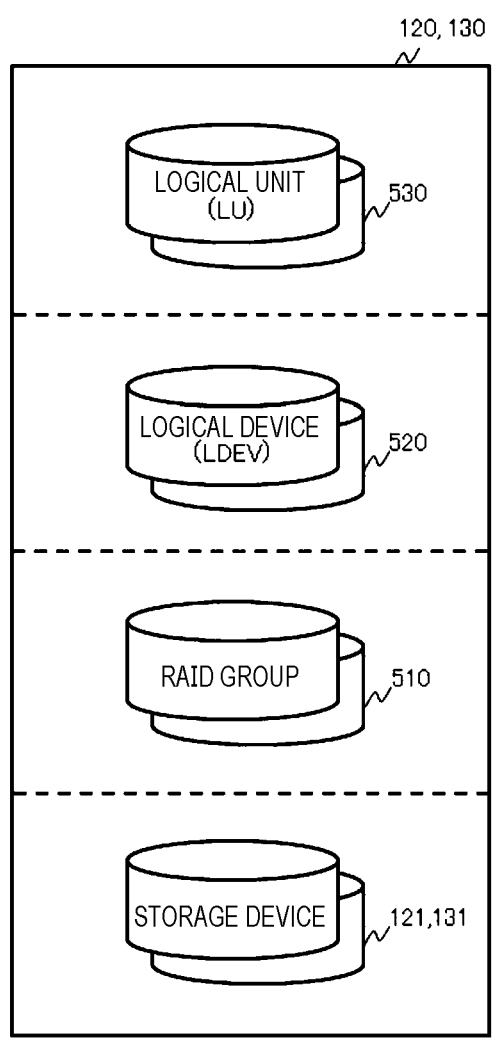
FIG. 5 is a diagram illustrating the first embodiment and the second embodiment of the present invention and illustrating an example of a hierarchical structure of a storage area of a storage apparatus.

FIG. 5 is an explanatory diagram illustrating a hierarchical structure of storage areas of the first storage apparatus 120 and the second storage apparatus 130 according to the first embodiment and the second embodiment. Although the first storage apparatus 120 will be described hereinafter, the second storage apparatus 130 also has the same hierarchical structure, and thus, will not be described.

The first storage apparatus 120 provides a storage area provided by the storage device 121 as a logical unit (LU) 530 to the host computer 110.

In this case, a plurality of intermediate storage tiers, configured to associate the storage device 121 with the logical unit 530, is provided between the storage device 121 and the logical unit 530. The intermediate storage tier can include, for example, a RAID group 510 and a logical device (LDEV) 520.

The RAID group 510 is an intermediate storage tier that connects the storage device 121 which is a lower storage tier and the logical device 520 which is an upper storage tier, and is defined on a storage area provided by each of the storage devices 121 constituting the RAID group.

The logical device 520 is an intermediate storage tier that connects the RAID group 510, which is a lower storage tier, and the logical unit 530 that is an upper storage tier, and is a storage area configured by aggregating all or some of storage areas of one or a plurality of the RAID groups 510 or a storage area configured by extracting some of storage areas of the RAID group 510.

The logical device 520 can have attributes of the ALU 215 and the SLU 217.

Figure 6:
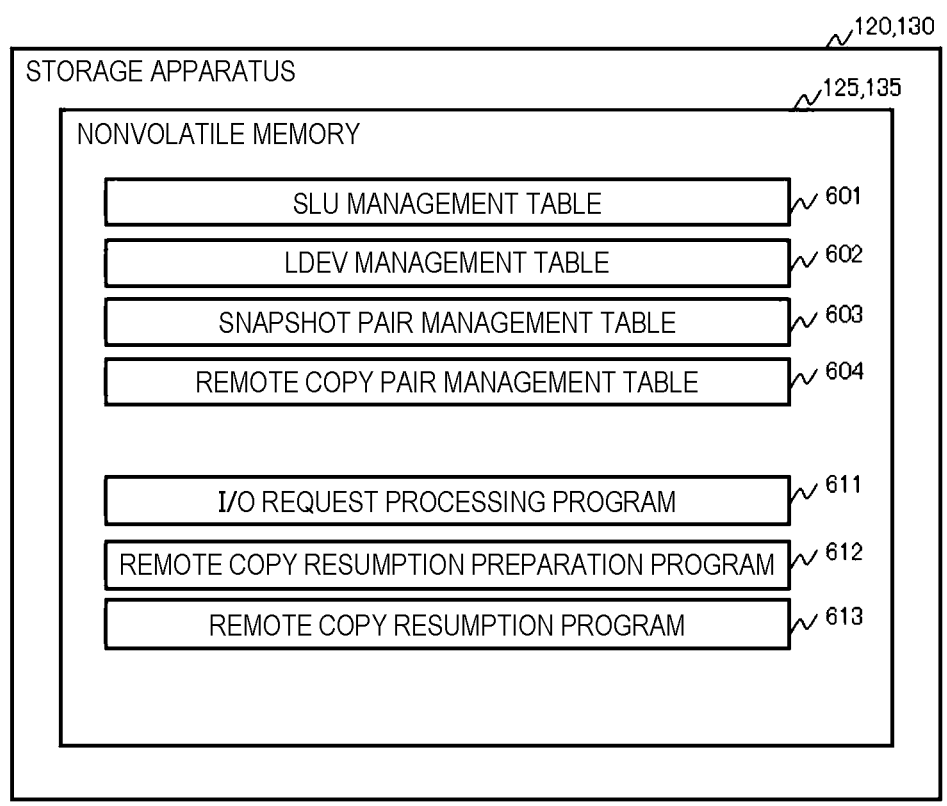
FIG. 6 is a diagram illustrating the first embodiment of the present invention and illustrating examples of programs and tables in the storage apparatus.

FIG. 6 is an explanatory diagram illustrating program and table configurations in the nonvolatile memories 125 and 135 of the storage apparatuses 120 and 130 according to the first embodiment.

Since the first storage apparatus 120 and the second storage apparatus 130 have the same configuration, the description regarding the second storage apparatus 130 will not be given.

In FIG. 6, an SLU management table 601, an LDEV management table 602, a snapshot pair management table 603, a remote copy pair management table 604, an I/O request processing program 611, a remote copy resumption preparation program 612, and a remote copy resumption program 613 are stored in the nonvolatile memory 125. The respective tables 601 to 604 and the respective programs 611 to 613 are transferred from the nonvolatile memory 125 to the main memory 124 and are executed by the CPU 123. Incidentally, the respective tables 601 to 604 are set in advance by the management computer 140.

In addition, the first storage apparatus 120 and the second storage apparatus 130 communicate with each other at a predetermined timing to update the remote copy pair management table 604. For example, when the first storage apparatus 120 updates the remote copy pair management table 604, the second storage apparatus 130 is notified of the update content. Alternatively, the management computer 140 may update the remote copy pair management table 604 at a predetermined timing.

The SLU management table 601 is a table configured to allow the CPU 123 of the first storage apparatus 120, for example, to store a logical unit number (LUN), an ALU ID, an SLU ID, and an I/O queuing flag corresponding to a port for each of ports of the own storage apparatus. Details of this table will be described with reference to FIG. 7.

The LDEV management table 602 is a table configured to allow the CPU 123 of the first storage apparatus 120, for example, to store an LDEV ID, an LDEV start address, and an LDEV end address for each of the SLUs defined in the own storage apparatus. Details of this table will be described with reference to FIG. 8.

The snapshot pair management table 603 is a table configured to allow the CPU 123 of the first storage apparatus 120, for example, to store an LDEV ID of a snapshot creation source, an LDEV ID of a snapshot volume, and a pair state for each of snapshot pairs defined in the own storage apparatus. Details of this table will be described with reference to FIG. 9.

The remote copy pair management table 604 is a table configured to allow the CPU 123 of the first storage apparatus 120, for example, to store an LDEV ID, a volume attribute, an LDEV ID of a partner forming a remote copy pair, and a storage apparatus ID of a partner forming a remote copy pair for each of remote copy pairs defined in the own storage apparatus. Details of this table will be described with reference to FIG. 10.

The I/O request processing program 611 is a program configured to cause the CPU 123 of the first storage apparatus 120 to process a command that requests I/O processing of data received from the host computer 110 (a read command, a write command, or the like). Details of this program will be described with reference to FIG. 11.

The remote copy resumption preparation program 612 is a program configured to cause the CPU 123 of the first storage apparatus 120 to process a command requesting remote copy resumption preparation for a snapshot volume received from the management computer 140. Details of this program will be described with reference to FIG. 12.

The remote copy resumption program 613 is a program configured to cause the CPU 123 of the first storage apparatus 120 to copy data of an SLU of the own storage apparatus to an SLU in a different storage apparatus. Details of this program will be described with reference to FIG. 13.

Hereinafter, the respective tables stored in a nonvolatile memory 146 of the second storage apparatus 130 of the present invention will be described with reference to FIGS. 7 to 10.

Figure 7:
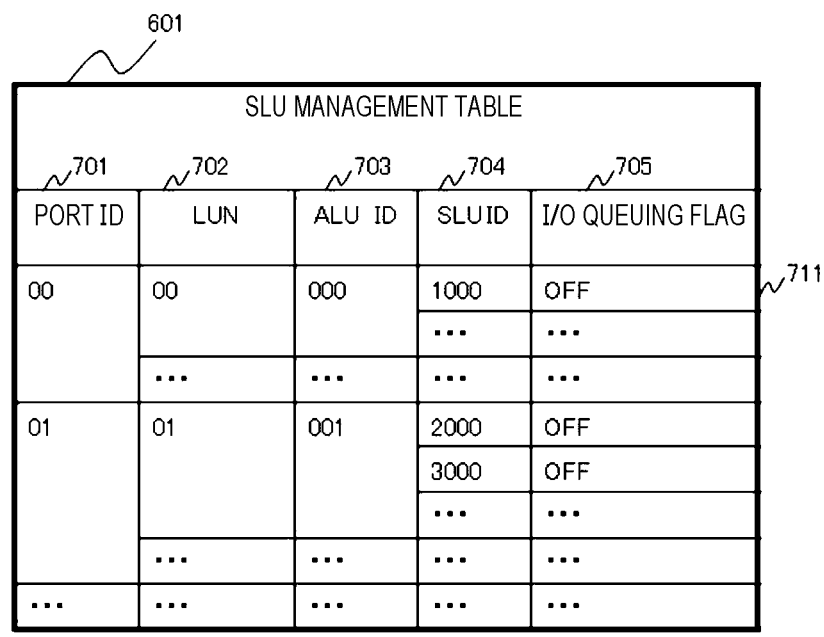
FIG. 7 is a table illustrating the first embodiment of the present invention and illustrating an example of an SLU management table.

FIG. 7 is a table illustrating an example of the SLU management table 601 according to the first embodiment.

The SLU management table 601 manages, for example, a port ID column 701, a LUN column 702, an ALU ID column 703, an SLU ID column 704, and an I/O queuing flag column 705 in association with each other.

In the port ID column 701, identification information of the ports 128 and 138 defined in the own storage apparatus is stored. In the LUN column 702, a LUN which is identification information of the LU 214 is stored.

In the ALU ID column 703, identification information of the ALU 215 is stored. In the SLU ID column 704, identification information (virtual ID) of the SLU 217 defined for each ALU is stored.

In the I/O queuing flag column 705, information indicating whether or not to take I/O for the SLU out of a queue is stored. Queuing continues without taking the I/O out of the queue if a queuing flag is ON. If the queuing flag is OFF, it indicates that the I/O can be taken out of the queue. Incidentally, the queue is set in advance in predetermined areas of the cache memories 126 and 136.

For example, a row 711 indicates that an SLU ID "1000" is associated with an ALU ID "000", a LUN "00", and a port ID "00", and the I/O queuing flag of the SLU is "OFF".

Figure 8:
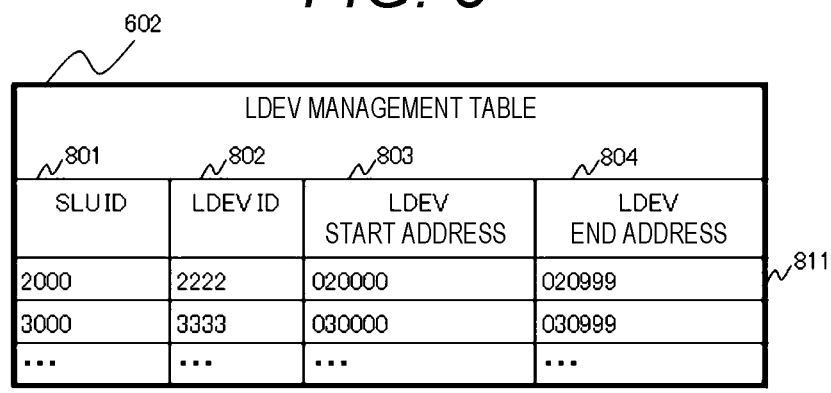
FIG. 8 is a table illustrating the first embodiment of the present invention and illustrating an example of an LDEV management table.

FIG. 8 is a table illustrating an example of the LDEV management table 602 according to the first embodiment.

The LDEV management table 602 manages, for example, an SLU ID column 801, an LDEV ID column 802, an LDEV start address column 803 column, and an LDEV end address column 804 in association with each other.

In the SLU ID column 801, identification information (virtual ID) of an SLU defined in the own storage apparatus is stored. In the LDEV ID column 802, identification information of an LDEV associated with the SLU is stored.

In the LDEV start address column 803, start address information of an area of the LDEV associated with the SLU is stored. In the LDEV end address column 804, end address information of the area of the LDEV associated with the SLU is stored.

For example, a row 811 indicates that an LDEV ID associated with an SLU ID "2000" is "2222", a start address and an end address of an area of the LDEV are "020000" and "020999", respectively.

FIG. 9 is a table illustrating an example of the snapshot pair management table 603 according to the first embodiment and the second embodiment.

The snapshot pair management table 603, for example, manages a pair ID column 901, a snapshot creation source LDEV ID column 902, a snapshot volume LDEV ID column 903, and a pair state column 904 in association with each other.

In the pair ID column 901, identification information of a snapshot pair defined in the own storage apparatus is stored. In the snapshot creation source LDEV ID column 902, identification information of an LDEV of a volume serving as a snapshot creation source of the snapshot pair is stored.

In the snapshot volume LDEV ID column 903, identification information of an LDEV of a snapshot volume forming a pair relationship with the snapshot creation source LDEV is stored. In the pair state column 904, information on a copy pair state (PAIR (duplication), Suspend (division), or the like) of the snapshot pair is stored.

For example, a row 911 indicates that a snapshot creation source LDEV ID of a snapshot pair ID "1-1" is "2222", an LDEV ID of a snapshot volume is "3333", and a pair state is "Suspend (division)".

In a different example of the drawing, it is indicated that the SLU 2 (LDEV ID 902=2222) and the SS VOL 322 (LDEV ID 902=3333) of the second storage apparatus 130 in FIG. 3 are in a relationship of a copy pair. Incidentally, the copy pair defines a relationship of replication between different logical devices.

FIG. 10 is a table illustrating an example of the remote copy pair management table 604 according to the first embodiment and the second embodiment.

The remote copy pair management table 604 manages, for example, a pair ID column 1001, an LDEV ID column 1002, an pair attribute column 1003, a pair partner LDEV ID column 1004, and a pair partner storage apparatus ID column 1005 in association with each other.

In the pair ID column 1001, identification information of a remote copy pair defined in the own storage apparatus is stored. In the LDEV ID column 1002, identification information of an LDEV of the own storage apparatus side of the remote copy pair is stored.

In the pair attribute column 1003, information on a remote copy pair attribute (PVOL or SVOL) of the LDEV is stored. In the pair partner LDEV ID column 1004, identification information of an LDEV of a remote copy partner of the LDEV is stored.

In the pair partner storage apparatus ID column 1005, identification information of a storage apparatus of the remote copy partner of the LDEV is stored.

For example, a row 1011 indicates that an LDEV ID of the own storage apparatus side of a remote copy pair ID "1" is "2222", a pair attribute of the LDEV is "SVOL", and an LDEV ID of a remote copy partner of the LDEV is "1111", and a storage apparatus ID of the remote copy partner is "ST01".

Incidentally, the remote copy pair defines a relationship of replication of a logical device between different storage apparatuses (the first storage apparatus 120 and the second storage apparatus 130).

Hereinafter, various kinds of processing performed in the first embodiment will be described in detail with reference to FIGS. 11 to 13. Each flowchart illustrates an outline of each processing within a range necessary for understanding and implementing the present invention, but the order of processes may be not necessarily limited to the illustrated order.

Figure 11:
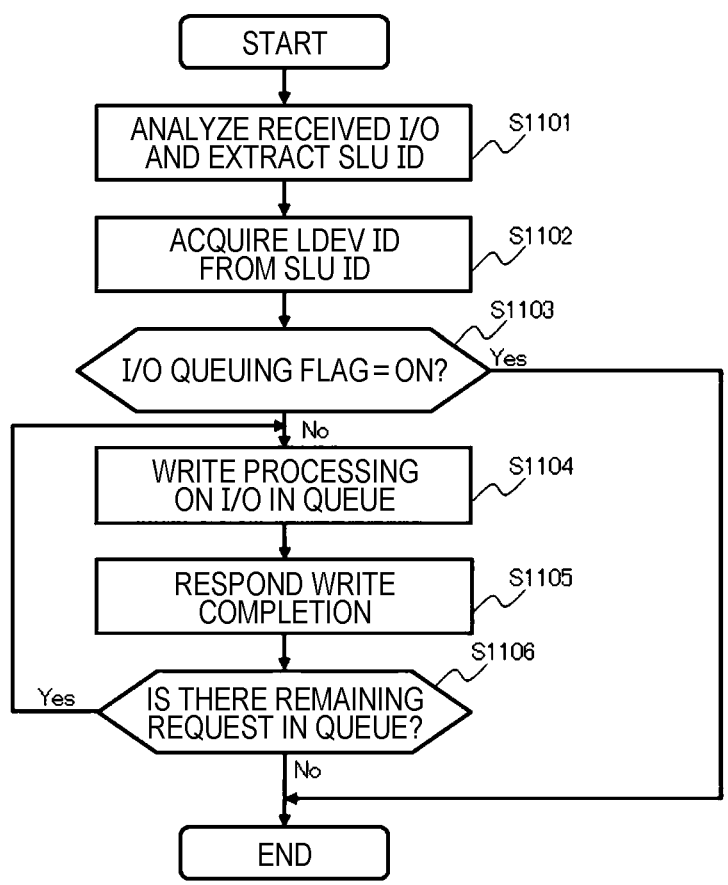
FIG. 11 illustrates the first embodiment of the present invention and illustrates an example of a flowchart of an I/O request processing program.

FIG. 11 is a flowchart illustrating processing performed by the I/O request processing program 611 according to the first embodiment.

This processing is started with reception of write request by the first storage apparatus 120 and the second storage apparatus 130 from the host computer 110 as a trigger.

Hereinafter, an example in which the first storage apparatus 120 receives the write request will be described. In Step S1101, the I/O request processing program 611 analyzes an SCSI command, issued from the host computer 110 and stored in the queue, and acquires a port ID, a LUN, an ALU ID, and an SLU ID which are designated as I/O destinations.

In Step S1102, the I/O request processing program 611 searches the "SLU ID" column 704 in the SLU management table 601 for the SLU ID acquired in Step S1101, and acquires a value of the corresponding "I/O queuing flag" column 705.

In Step S1103, the I/O request processing program 611 ends the processing when the value of the "I/O queuing flag" column 705 acquired in Step S1102 is ON (S1103: YES), and the processing transitions to Step S1104 when the value is OFF (S1103: NO).

In Step S1104, when it is determined as NO in Step S1103, the I/O request processing program 611 acquires a request from the queued host computer 110 and performs write processing to the SLU 1 (320).

When the remote copy from the SLU 1 (320) to the SLU 2 (321) of the second storage apparatus 130 is asynchronous remote copy, the I/O request processing program 611 writes update data, as a journal, to a journal volume after completing the writing processing to the SLU 1 (320), and transitions to Step S1105.

Even after the transition to Step S1105, the journal written in the journal volume of the first storage apparatus 120 is asynchronously copied to a journal volume of the second storage apparatus 130 via the WAN 170 and the copied journal is reflected on the SLU 2 (321).

When the remote copy from the SLU 1 (320) to the SLU 2 (321) of the second storage apparatus 130 is synchronous remote copy, the I/O request processing program 611 transfers update data from the SLU 1 (320) to the SLU 2 (321) after completion of the write processing to the SLU 1 (320), and transitions to Step S1105 after receiving a response indicating that the transferred update data has been reflected on the SLU 2 (321).

In Step S1105, the I/O request processing program 611 makes a response with respect to the SCSI command, which is the request from the host computer 110 taken out of the queue, to indicate that the write processing has been completed.

In Step S1106, the I/O request processing program 611 transitions to Step S1104 and repeats the above-described processes if it is a state where the request from the host computer 110 is queued in the first storage apparatus 120 (S1106: YES), and ends the processing if there is no queued request.

Although the example of controlling the extraction from the stored queue when receiving the I/O request based on the value (ON/OFF) of the "I/O queuing flag" column 705 of the SLU management table 601 has been illustrated in the present embodiment, another queue storing an I/O request may be used when the value of the "I/O queuing flag" column 705 is ON, or other queue management methods may be used.

Figure 12:
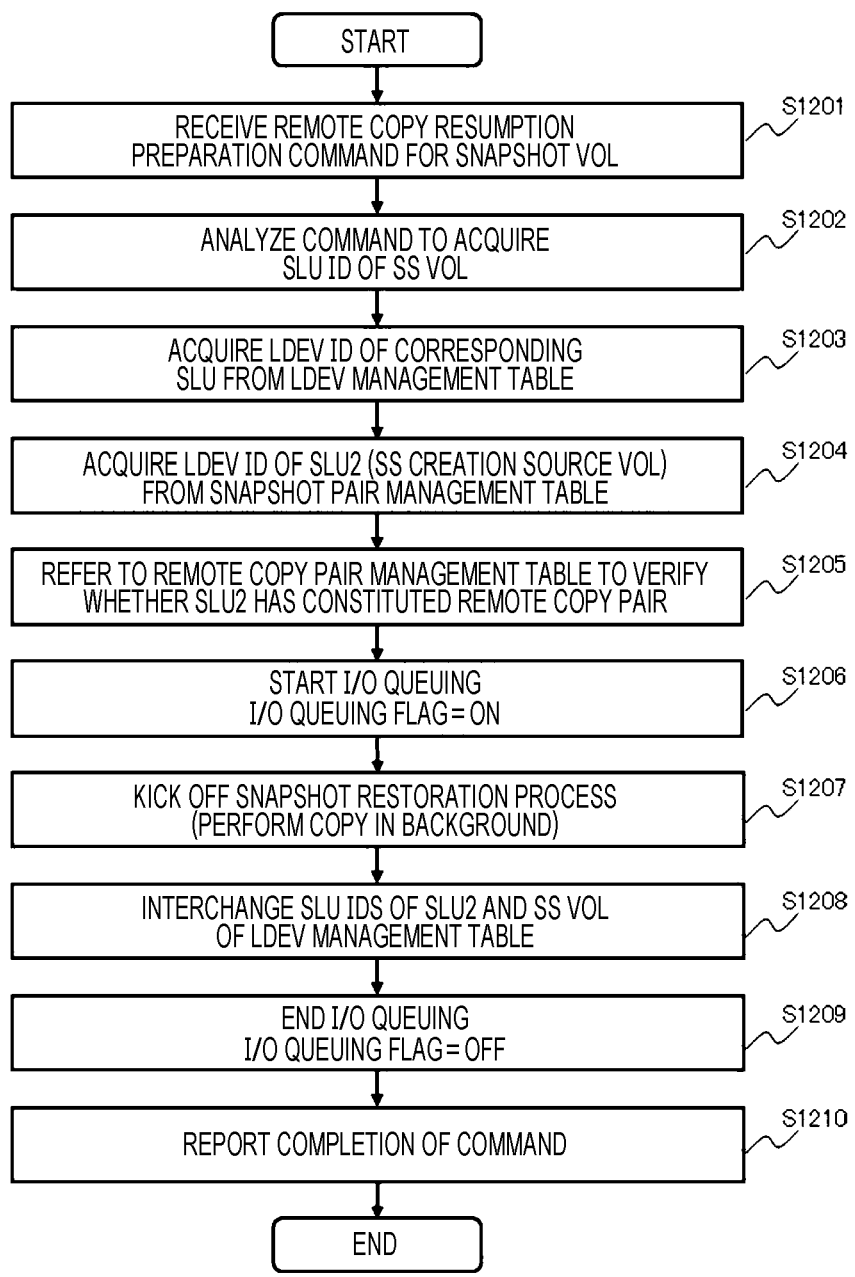
FIG. 12 illustrates the first embodiment of the present invention and illustrates an example of a flowchart of a remote copy resumption preparation program.

FIG. 12 is a flowchart illustrating processing performed by the remote copy resumption preparation program 612 according to the first embodiment.

In the first embodiment, this processing is performed with reception of the "remote copy resumption preparation command" for the SS VOL 322 by the second storage apparatus 130 from the management computer 140 as a trigger.

In Step S1201, the remote copy resumption preparation program 612 receives the remote copy resumption preparation command from the management computer 140.

In Step S1202, the remote copy resumption preparation program 612 acquires an SLU ID of the SS VOL 322 which is a snapshot VOL from the remote copy resumption preparation command received from the management computer 140.

In Step S1203, the remote copy resumption preparation program 612 searches the "SLU ID" column 801 of the LDEV management table 602 for the SLU ID of the SS VOL 322 acquired in S1202, and acquires a value of the "LDEV ID" column 802 corresponding to a search result.

In Step S1204, the remote copy resumption preparation program 612 searches the "snapshot VOL LDEV ID" column 903 of the snapshot pair management table 603 for the LDEV ID of the SS VOL 322 acquired in S1203, and acquires a value of the "snapshot creation source LDEV ID" column 902 corresponding to a search result as an LDEV ID of the SLU 2 (321).

In addition, the remote copy resumption preparation program 612 searches the "LDEV ID" column 802 of the LDEV management table 602 for the LDEV ID of the SLU 2 (321) acquired as above, and acquires a value of the "SLU ID" column 801 corresponding to a search result. This value is used in Step S1209.

In Step S1205, the remote copy resumption preparation program 612 searches the "LDEV ID" column 1002 of the remote copy pair management table 604 for the LDEV ID of the SLU 2 (321) acquired in Step S1204, and verifies that the corresponding row exists (that is, the SLU 2 (321) has already configured a remote copy pair). Incidentally, the processing is ended when the SLU (321) has not configured a remote copy pair.

In Step S1206, the remote copy resumption preparation program 612 searches the "SLU ID" column 704 of the SLU management table 601 for the SLU ID of the SS VOL 322 specified in Step S1202, and changes a value of the "I/O queuing flag" column 705 corresponding to a search result to ON.

In Step S1207, the remote copy resumption preparation program 612 kicks off a snapshot restoration process from the SS VOL 322 specified in Step S1202 to the SLU 2 (321) specified in Step S1204, and transitions to Step S1208. In the snapshot restoration process performed in the background with the kick-off as a trigger, only differential data between the SS VOL 322 and the SLU 2 (321) is copied.

In Step S1208, the remote copy resumption preparation program 612 updates one whose value is the SLU ID of the SS VOL 322 to the SLU ID of the SLU 2 (321) and updates one whose value is the SLU ID of the SLU 2 (321) to the SLU ID of the SS VOL 322 for the "SLU ID" column 801 of the LDEV management table 602, thereby interchanging the values.

Due to this change of the SLU ID column 801, the I/O request of the virtual machine 210-B illustrated in FIG. 4 is changed from the I/O path 411 to the I/O path 413 and transmitted to the SLU 2 (321).

In Step S1209, the remote copy resumption preparation program 612 searches the "SLU ID" column 704 of the SLU management table 601 for the SLU ID of the SS VOL 322 specified in Step S1202 (the SLU ID of the SLU 2 (321) after interchanging the SLU IDs), and changes a value of the "I/O queuing flag" column 705 corresponding to a search result to OFF.

In Step S1210, the remote copy resumption preparation program 612 notifies the management computer 140 of a response indicating that the processing of the remote copy resumption preparation command has been completed, and ends the processing.

As a result of the above processing, in the second storage apparatus 130, the remote copy resumption preparation program 612 changes the value of the I/O queuing flag column 705 of the SS VOL 322 being accessed by the virtual machine 210-B to ON, and interchanges the SLU IDs of the SS VOL 322 and the SLU 2 (321) after stopping the issuance of the I/O request, whereby the I/O path 411 is switched to the I/O path 413.

Then, the remote copy resumption preparation program 612 kicks off the snapshot restoration process after the start of queuing to execute the process in the background. As a result, only the differential data is copied from the SS VOL 322 to the SLU 2 (321), and the snapshot restoration process is executed.

Thereafter, the remote copy resumption preparation program 612 changes the value of the I/O queuing flag column 705 of the SLU 2 (321) to OFF, thereby transferring the I/O request issued by the virtual machine 210-B to the SLU 2 (321). As a result, the logical volume to be read or written by the virtual machine 210-B is switched from the SS VOL 322 to the SLU 2 (321). Incidentally, there is a case where the snapshot restoration process is continued even after the end of queuing.

Figure 13:
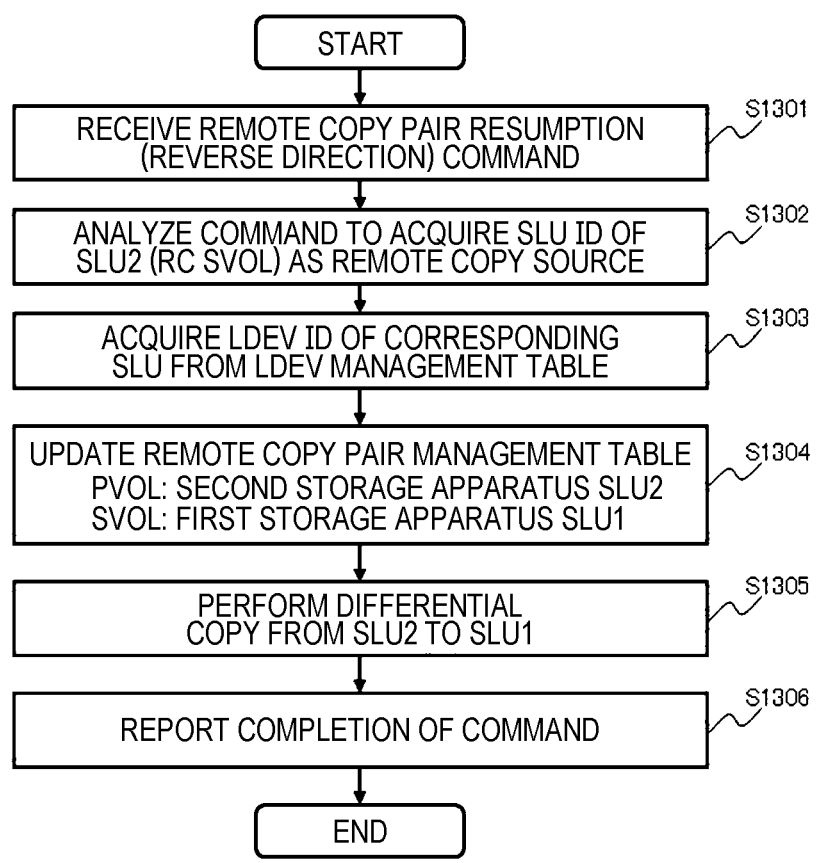
FIG. 13 illustrates the first embodiment of the present invention and illustrates an example of a flowchart of a remote copy resumption program.

FIG. 13 is a flowchart illustrating processing performed by the remote copy resumption program 613 in the first embodiment.

In the first embodiment, this processing is performed with reception of a "remote copy resumption (reverse direction) command" by the remote copy resumption program 613 of the second storage apparatus 130 from the management computer 140 as a trigger.

In Step S1301, the remote copy resumption program 613 receives the remote copy resumption (reverse direction) command from the management computer 140.

In Step S1302, the remote copy resumption program 613 acquires the SLU ID of the SLU 2 (321), which is the RC SVOL, from the remote copy resumption (reverse direction) command received from the management computer 140.

Here, the SLU ID included in the remote copy resumption (reverse direction) command received from the management computer 140 by the remote copy resumption program 613 in Step S1301 and the SLU ID included in the remote copy resumption preparation command received from the management computer 140 by the remote copy resumption preparation program 612 in Step S1201 of FIG. 12 are the same values. However, since the IDs of the SLU 2 (321) and SS VOL (322) are interchanged in Step S1207 of FIG. 12, the SLU indicated by this SLU ID is the value changed from SS VOL 322 to the SLU 2 (321).

In Step S1303, the remote copy resumption program 613 searches the "SLU ID column" 801 of the LDEV management table 602 for the SLU ID of the SLU 2 (321) acquired in Step S1302, and acquires the value of the "LDEV ID" column 802 corresponding to a search result.

In Step S1304, the remote copy resumption program 613 searches the "LDEV ID" column 1002 of the remote copy pair management table 604 possessed by the second storage apparatus 130 for an LDEV ID corresponding to the SLU 2 (321) acquired in S1303, and changes a value of the "pair attribute" column 1003 corresponding to a search result from SVOL to PVOL.

In addition, the remote copy resumption program 613 instructs the first storage apparatus 120 to change the value of the "pair attribute" column 1003 of the row having the same pair ID in the remote copy pair management table 604 from PVOL to SVOL.

In Step S1305, the remote copy resumption program 613 executes differential copy from the SLU 2 (321) to the SLU 1 (320). Specifically, the remote copy from the SLU 1 (320) to the SLU 2 (321) is divided, and then, processing is performed to copy only the data of an area where update has occurred in the SLU 2 (321) from the SLU 2 (321) to the SLU 1 (320).

In Step S1306, the remote copy resumption program 613 notifies the management computer 140 of a response indicating the completion of resumption of the remote copy, and ends the process. Incidentally, the processing in this step may be performed at a predetermined timing, for example, after the end of S1304 and before the start of S1305.

Through the above processing, the relationship between the copy pair of the first storage apparatus 120 and the second storage apparatus 130 is reversed, and remote copy is performed from the SLU 2 (321) of the second storage apparatus 130 to the SLU 1 (320) of the first storage apparatus 120.

Figure 19:
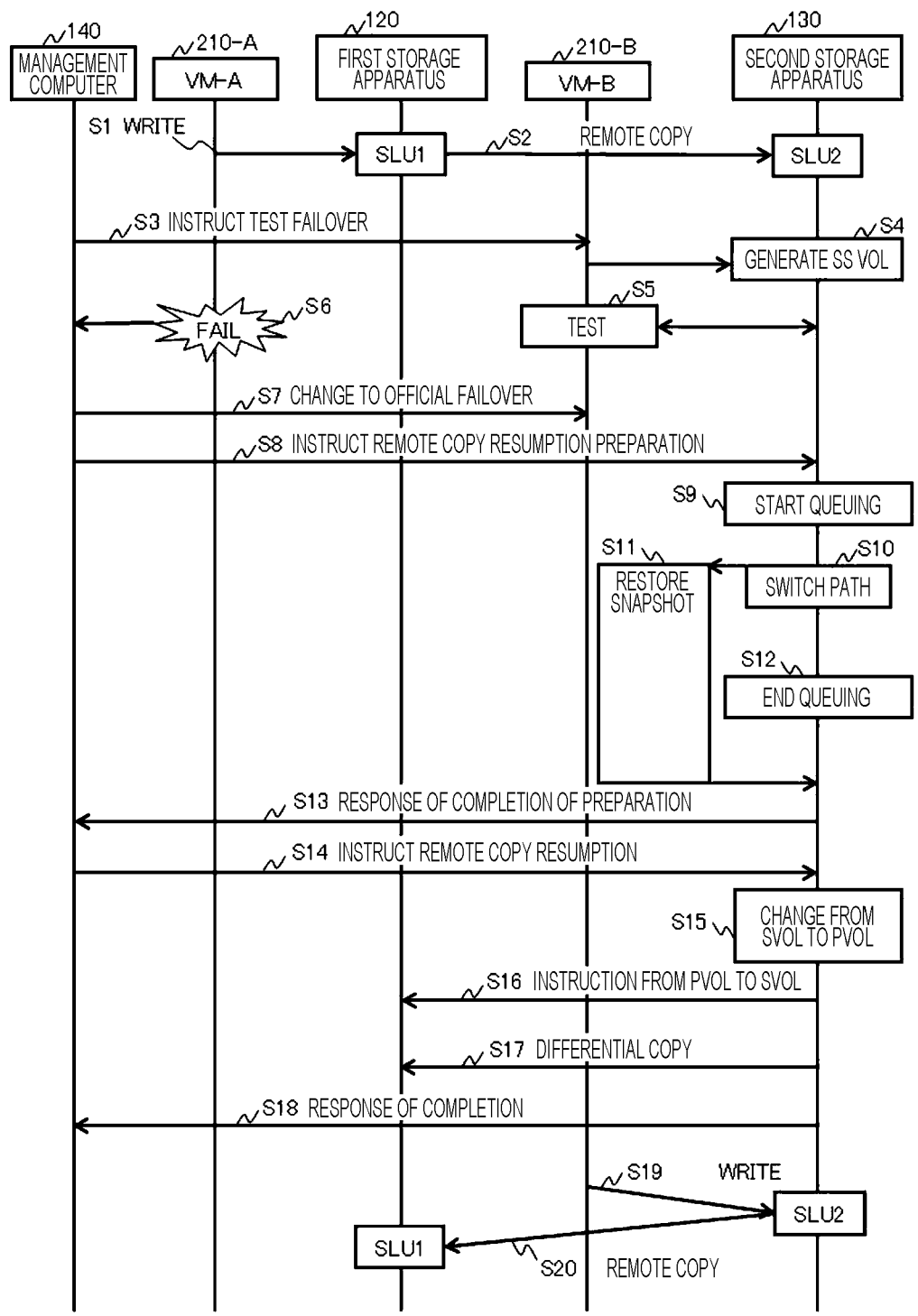
FIG. 19 is a sequence diagram illustrating the first embodiment of the present invention and illustrating an example of a process from the test failover to the remote copy resumption.

FIG. 19 is a sequence diagram illustrating an example of processing performed in the entire computer system from the test failover to the remote copy resumption.

In the first host computer 110-A, the virtual machine 210-A operates on the primary site (active system). When the virtual machine 210-A performs write to the first storage apparatus 120 (S1), the data written in the SLU 1 (320) is remotely copied to the SLU 2 (321) of the second storage apparatus 130 which is a remote copy pair (S2).

Next, the management program 148 of the management computer 140 transmits an instruction for a test failover to the virtual machine 210-B of the second host computer 110-B (S3). The virtual machine 210-B operating on the secondary site (standby system) causes the second storage apparatus 130 to generate the snapshot volume (SS VOL 322) of the SLU 2 (S4), and performs a failover test using the SS VOL 322 (S5).

Incidentally, when generating the SS VOL 322, the second storage apparatus 130 sets a virtual ID (SLU ID) of the corresponding logical device, and causes the virtual machine 210-B issuing the I/O request to recognize the virtual ID.

In the virtual machine 210-B, a failure occurs in the virtual machine 210-A of the primary site during execution of the test failover (S6). When detecting that the failure has occurred in the virtual machine 210-A, the management computer 140 transmits an instruction to switch from the test failover to an official failover to the virtual machine 210-B of the secondary site (S7). Then, the management computer 140 transmits a resumption preparation command for remote copy to the second storage apparatus 130 constituting the standby system (S8).

The second storage apparatus 130 starts queuing of the SS VOL 322 to inhibit the SS VOL 322 from being updated (S9), and then, the second storage apparatus 130 interchanges the SLU IDs of the SS VOL 322 and the SLU 2 (321) to switch the SLU to be accessed by the virtual machine 210-B to the SLU 2 (321) of the copy pair S-VOL (S10). In addition, the snapshot restoration process is executed in the background (S11), and the differential data between the SS VOL 322 and the SLU 2 (321) is copied to the SLU 2 (321).

Next, the second storage apparatus 130 ends the queuing and permits an access to the SLU 2 (321) of the virtual machine 210-B (S12). The second storage apparatus 130 notifies the management computer 140 of the completion of preparation for resuming the remote copy (S13). Incidentally, there is a case where the snapshot restoration process continues even after the queuing ends as described above.

When receiving the completion of preparation for resuming the remote copy, the management program 148 of the management computer 140 transmits the remote copy resumption command to the second storage apparatus 130 (S14).

The remote copy resumption program 613 of the second storage apparatus 130 changes the pair attribute column 1003 of the SLU 2 (322) from SVOL to PVOL in the remote copy pair management table 604 (S15). Next, the remote copy resumption program 613 instructs the first storage apparatus 120 to change the pair attribute of the SLU 1 (320), which is a copy pair of the SLU 2 (322), from PVOL to SVOL (S16).

Then, the remote copy resumption program 613 copies a differential between SLU 2 (322) and SLU 1 (320) to the SLU 1 (320) (S17). When the differential copy has been completed, the remote copy resumption program 613 notifies the management computer 140 that the resumption of the remote copy has been completed (S18). Thereafter, when receiving write from the virtual machine 210-B, the second storage apparatus 130 performs remote copy of the data written in the SLU 2 (322) to the SLU 1 (320).

As described above, when the failure occurs during the test failover in the first embodiment, the second storage apparatus 130 stops the I/O request to the snapshot (SS VOL), which has been used by the standby virtual machine 210-B, writes the differential from the snapshot to the SLU 2 (322) which is the SVOL of the remote copy, and then, interchanges IDs of the snapshot and the SLU 2 to switch a path of a volume to be written by the virtual machine 210-B.

Next, the second storage apparatus 130 permits the I/O request from the virtual machine 210-B to the SLU 2, switches the relationship between the PVOL and the SVOL of the SLU 1 (320) of the first storage apparatus 120 in the relationship of the copy pair with the SLU 2 of the second storage apparatus 130, and then, performs the differential copy to restore the SLU 1.

In the first embodiment, it is unnecessary to perform full copy from the SS VOL, which has been used in the test failover, to the PVOL of the first storage apparatus 120 as in the above-described related art, and it is sufficient if the differential copy and the switching of the SLU IDs, and the switching of the remote copy direction are performed, and thus, it is possible to shorten the time required for the failover. In other words, it is possible to implement the remote copy in the reverse direction from the snapshot of the secondary site to the logical device of the primary site, which does not constitute the remote copy pair, at high speed without performing the entire area copy.

Second Embodiment

A second embodiment of the present invention will be described with reference to FIGS. 14 to 18.

Figure 14:
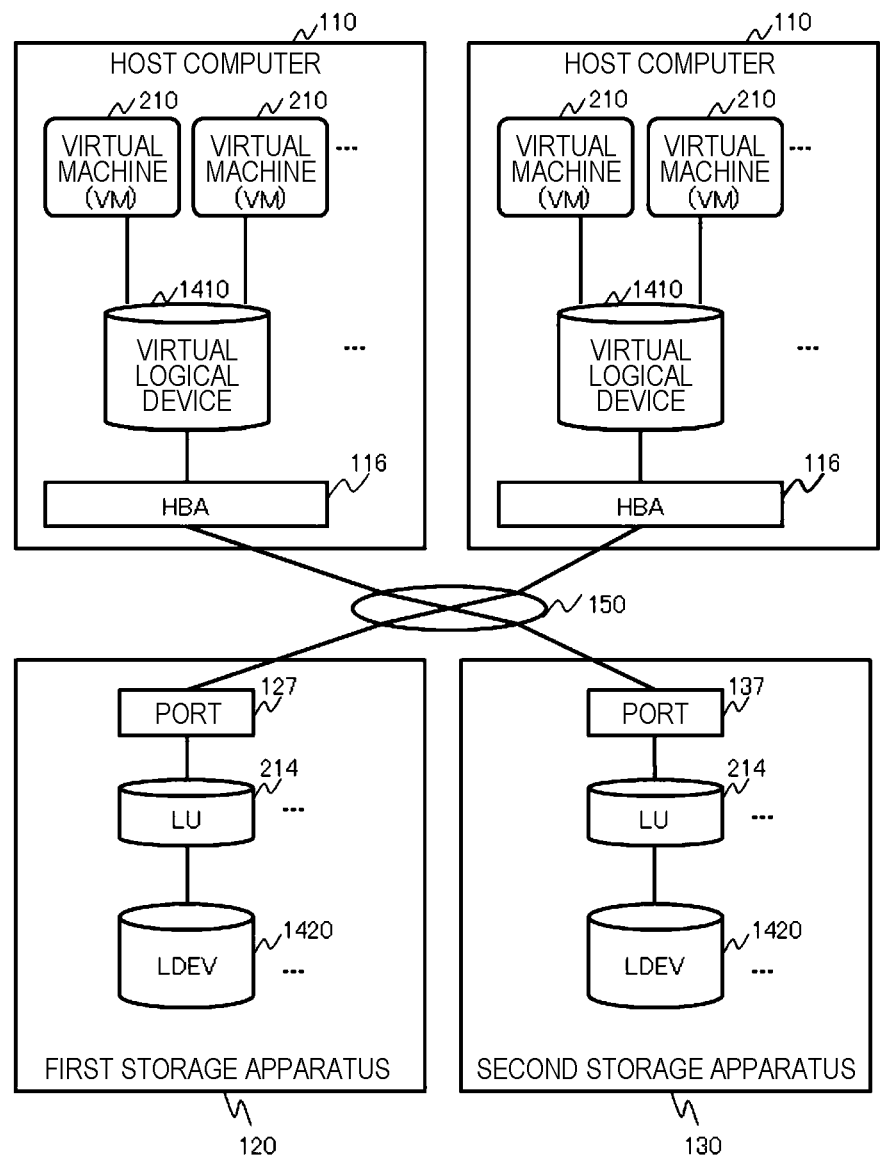
FIG. 14 is a block diagram illustrating the second embodiment of the present invention and illustrating an example of a logical configuration of the computer system.

FIG. 14 is a block diagram illustrating an example of a logical configuration of the computer system in the second embodiment. A physical configuration is the same as that of the first embodiment of FIG. 1. The host computer 110, the HBA 116, the port 127, the storage apparatuses 120 and 130, the SAN 150, the virtual machine 210, and the LU 214 in the second embodiment are the same as those in FIGS. 1 and 2 of the first embodiment, and thus, the description thereof will not be given.

The virtual logical device 1410 is a unit in which the host computer 110 recognizes the LU 214 of the storage apparatuses 120 and 130. In the second embodiment, a plurality of the virtual machines 210 in the same host computer 110 can share a virtual logical device 1410.

An I/O request (read, write, or the like) from the virtual machine 210 to the virtual logical device 1410 is issued as an I/O command to the storage apparatuses 120 and 130.

LDEVs 1420 of the first storage apparatus 120 and the second storage apparatus 130 are logical devices of the storage apparatuses 120 and 130. The LDEV 1420 is managed using an LDEV ID recognized by the host computer 110 or a virtual LDEV ID which is a virtual ID, and an example where the LDEV 1420 is managed using the virtual LDEV ID is illustrated in the second embodiment. The LDEV 1420 is managed in association with the LU 214 by (to be described later) a virtual LDEV management table 1600.

Figure 15:
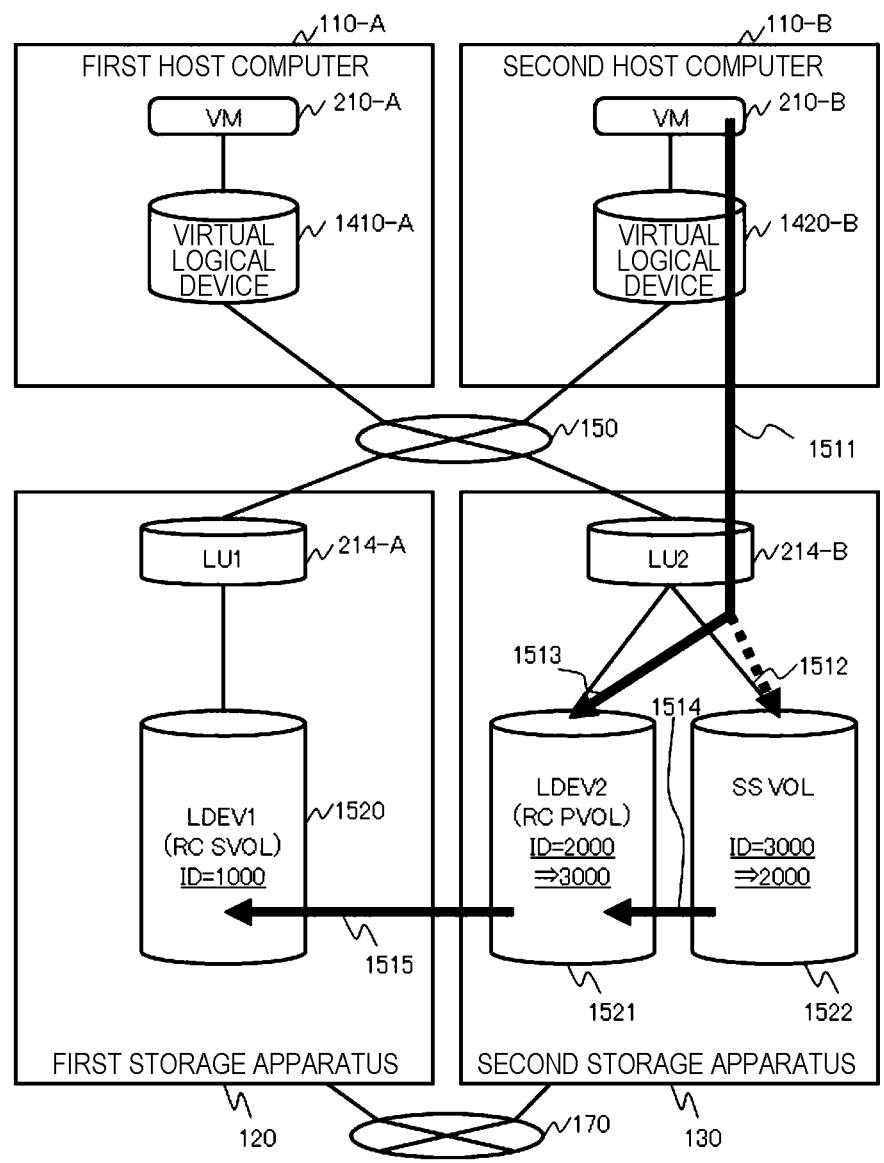
FIG. 15 is a diagram illustrating the second embodiment of the present invention and illustrating an example of I/O processing during remote copy reconfiguration.

FIG. 15 is a conceptual diagram of processing performed in I/O processing at the time of switching a remote copy direction according to the second embodiment. A description will be given focusing on a difference from FIG. 4 which is the schematic diagram of the I/O processing at the time of switching the remote copy direction according to the first embodiment.

An I/O request issued from the virtual machine 210-B of the second host computer 110-B to a virtual logical device 1420-B is transmitted to the second storage apparatus 130 via the SAN 150.

At this time, the second storage apparatus 130 having a SS VOL 1522 associated with a virtual logical device 1420-B receives this I/O request and performs I/O processing with respect to the SS VOL 1522.

The second storage apparatus 130 changes an I/O path from an I/O path 1512 to an I/O path 1513 according to an instruction from the management computer 140. Specifically, it is performed after changing an ID of the LDEV 2 (1521) from 2000 to 3000 and changing an ID of the SS VOL 1522 from 3000 to 2000 (details will be described later with reference to FIG. 18).

The processing and execution triggers of a snapshot restoration path 1514 and a remote copy path 1515 are the same as those of the snapshot restoration path 412 and the remote copy path 414 of FIG. 4. The processing and execution triggers will not be described since the description can be made by replacing the SLU 1 (320) and the SLU 2 (321) of FIG. 4 with the LDEV 1 (1520) and the LDEV 2 (1521).

FIG. 16 is a table illustrating an example of the virtual LDEV management table 1600 according to the second embodiment.

The virtual LDEV management table 1600 manages, for example, a port ID column 1601, a LUN column 1602, a virtual LDEV ID column 1603, and an I/O queuing flag column 1604 in association with each other.

In the virtual LDEV ID column 1603, identification information (virtual ID) of an LDEV virtually assigned to an LDEV defined in the own storage apparatus is stored.

In addition, the port ID column 1601, the LUN column 1602, and the I/O queuing flag column 1604 are the same as the port ID column 701, the LUN column 702, and the I/O queuing flag column 705 of FIG. 7 of the first embodiment, and thus, will not be described.

For example, in a row 1611, a virtual LDEV ID "1000" is associated with a LUN "00" and a port ID "00", and it is indicated that the I/O queuing flag of the LDEV is "OFF".

FIG. 17 is a table illustrating an example of a virtual LDEV-actual LDEV management table 1700 according to the second embodiment.

The virtual LDEV-actual LDEV management table 1700 manages, for example, a virtual LDEV ID 1701 column, an LDEV ID column 1702, an LDEV start address column 1703 column, and an LDEV end address column 1704 in association with each other.

In the virtual LDEV ID column 1701, identification information (virtual ID) of the LDEV virtually assigned to the LDEV defined in the own storage apparatus is stored.

In addition, the LDEV ID column 1702, the LDEV start address column 1703 column, and the LDEV end address column 1704 are the same as the LDEV ID column 802, the LDEV start address column 803, and the LDEV end address column 804 in FIG. 8, and thus, will not be described.

For example, a row 1711 indicates that an LDEV ID associated with a virtual LDEV ID "2000" is "2222", a start address and an end address of an area of the LDEV are "020000" and "020999", respectively.

Figure 18:
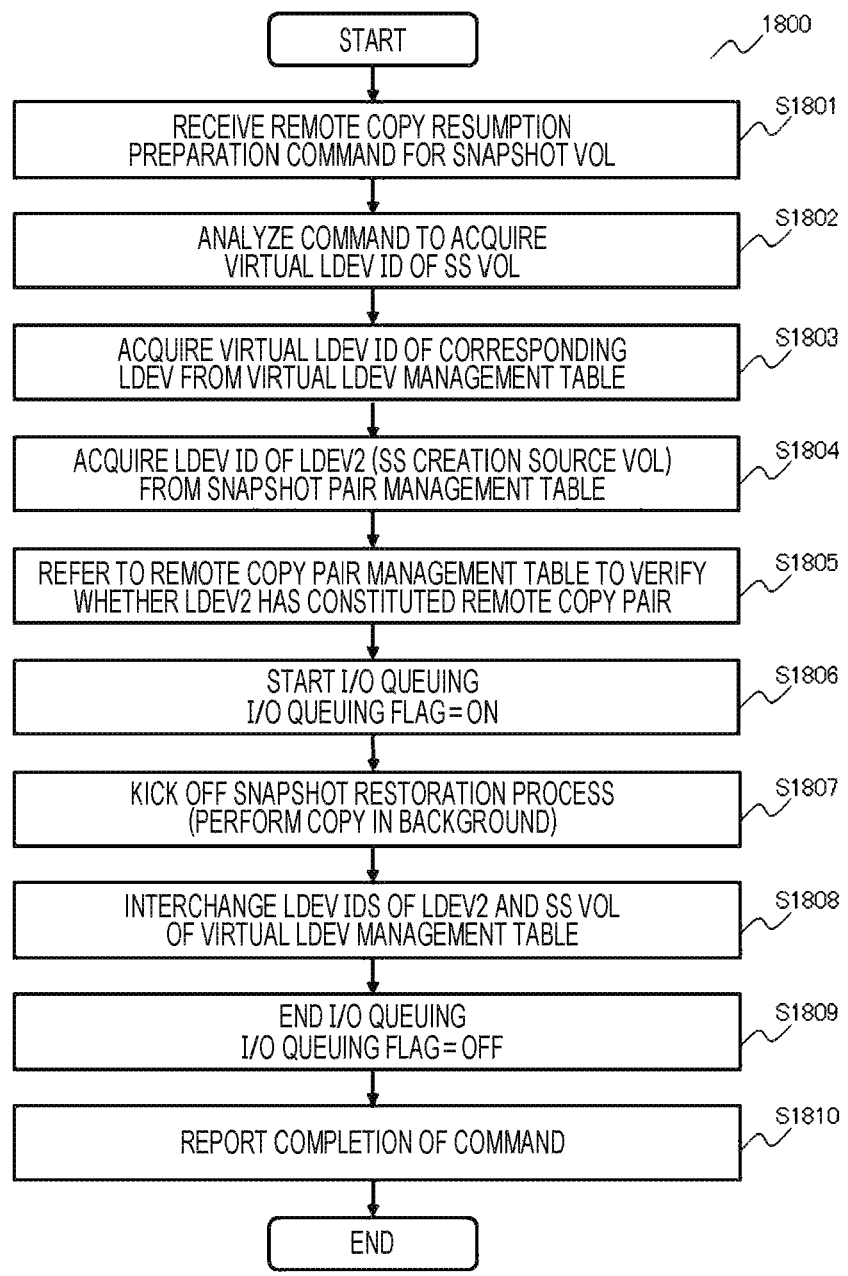
FIG. 18 illustrates the second embodiment of the present invention and illustrates an example of a flowchart of a remote copy resumption preparation program.

FIG. 18 is a flowchart illustrating an example of processing performed by a remote copy resumption preparation program 1800 according to the second embodiment.

In the second embodiment, this processing is performed with reception of a "remote copy resumption preparation command" for the SS VOL 1522 by the second storage apparatus 130 from the management computer 140 as a trigger.

In Step S1801, the remote copy resumption preparation program 1800 receives the remote copy resumption preparation command from the management computer 140. In Step S1802, the remote copy resumption preparation program 1800 acquires an LDEV ID of the SS VOL 1522 which is a snapshot VOL from the remote copy resumption preparation command received from the management computer 140.

In Step S1803, the remote copy resumption preparation program 1800 searches the "virtual LDEV ID" column 1701 of the virtual LDEV-actual LDEV management table 1700 for the LDEV ID of the SS VOL 1522 acquired in Step S1802, and acquires a value of the "LDEV ID" column 1702 corresponding to a search result.

In Step S1804, the remote copy resumption preparation program 1800 searches the "snapshot VOL LDEV ID" column 903 of the snapshot pair management table 603 for the LDEV ID of the SS VOL 1522 acquired in Step S1803, and acquires a value of the "snapshot creation source LDEV ID" column 902 corresponding to a search result as an LDEV ID of the LDEV 2 (1521).

In addition, the remote copy resumption preparation program 1800 searches the "virtual LDEV ID" column 1701 of the virtual LDEV-actual LDEV management table 1700 for the LDEV ID of the LDEV 2 (1521) acquired as above, and acquires a value of the "LDEV ID" column 1702 corresponding to a search result. This value is used in Step S1809.

In Step S1805, the remote copy resumption preparation program 1800 searches the "LDEV ID" column 1002 of the remote copy pair management table 604 for the LDEV ID of LDEV 2 (1521) acquired in Step S1804, and verifies that the corresponding row exists (that is, the LDEV 2 (1521) has already configured a remote copy pair).

In Step S1806, the remote copy resumption preparation program 1800 searches the "virtual LDEV ID" column 1603 of the virtual LDEV management table 1600 for the LDEV ID of the SS VOL 1522 specified in Step S1802, and changes a value of the corresponding "I/O queuing flag" column 1604 to ON.

In Step S1807, the remote copy resumption preparation program 1800 kicks off a snapshot restoration process from the SS VOL 1522 specified in Step S1802 to the LDEV 2 (1521) specified in Step S1804, and transitions to Step S1808. In the snapshot restoration process performed in the background with the kick-off as a trigger, only differential data between the SS VOL 1522 and the LDEV 2 (1521) is copied.

In Step S1808, the remote copy resumption preparation program 1800 updates one whose value is the LDEV ID of SS VOL 1522 to the LDEV ID of LDEV 2 (1521) and updates one whose value is LDEV 2 (1521) to the LDEV ID of the SS VOL 1522 for the "virtual LDEV ID" column 1701 of the virtual LDEV-actual LDEV management table 1700, thereby interchanging the IDs. As a result, the I/O path is switched from the I/O path 1512 to the I/O path 1513.

In Step S1809, the remote copy resumption preparation program 1800 searches the "virtual LDEV ID" column 1603 of the virtual LDEV management table 1600 for the LDEV ID of the SS VOL 1522 specified in S1802 (the LDEV ID of LDEV 2 (1521) after interchanging of the LDEV IDs), and changes a value of the "I/O queuing flag" column 1604 corresponding to a search result to OFF.

In Step S1810, the remote copy resumption preparation program 1800 notifies the management computer 140 of a response indicating that the the processing of the remote copy resumption preparation command has been completed, and ends the processing.

As described above, when a failure occurs during a test failover in the second embodiment, the write to the snapshot (SS VOL) that has been used by the standby virtual machine 210-B is stopped, and the virtual IDs (virtual LDEV IDs) of the snapshot and the LDEV 2 are interchanged to switch a path of a volume to be written by the virtual machine 210-B. In addition, the snapshot restoration process is executed in the background, and a differential from snapshot (SS VOL) is written to the LDEV 2 (1521) which is the SVOL of the remote copy. Next, the I/O request from the virtual machine 210-B to the LDEV 2 is permitted, the relationship between the PVOL and SVOL of the LDEV 1 of the first storage apparatus 120 having the relationship of the copy pair with the LDEV 2 of the second storage apparatus 130 is switched, and then, differential copy is performed to restore the LDEV 1. Incidentally, there is a case where the snapshot restoration process is continued even after the end of queuing.

In the second embodiment, it is also unnecessary to perform full copy from the SS VOL, which has been used in the test failover, to the PVOL of the first storage apparatus 120 as in the above-described related art, and it is sufficient if the differential copy and the switching of the IDs of the LDEV 2, and the switching of the remote copy direction are performed, and thus, it is possible to shorten the time required for recovery from the failover even when the virtual LDEV is adopted as the logical device.

Although the embodiments of the present invention have been described as above, the present invention is not limited to these embodiments, and, of course, can be modified in various ways within a scope not departing from a gist thereof. For example, in the first or second embodiment, the remote copy resumption program 613 may be executed continuously after executing the remote copy resumption preparation program 612 except for the completion response in S1210 with reception of one command, which is a combination of information of two commands of the remote copy pair resumption preparation command and the remote copy pair resumption (reverse direction) by the second storage apparatus 130 from the management computer 140 as a trigger.

In addition, in the first or second embodiment, each step of the remote copy resumption preparation program 612 and the remote copy resumption program 613 may be executed respectively with reception of different commands from the management computer 140 as a trigger. For example, a response may be made to the management computer 140 after executing S1202 to S1205 and the processes of S1206, S1207, S1208, and S1209 may be executed with reception of mutually different commands in the remote copy resumption preparation program 612, and a response may be made to the management computer 140 after executing S1302 to S1304 and the process of S1305 may be executed with reception of a different command in the remote copy resumption program 613.

In addition, in the first or second embodiment, it is possible to consider a configuration, as one of modifications, in which a part or the whole of the storage apparatus is not included since a virtual machine in a server in a host computer serves a role as a host computer, and each program and each table of the first storage apparatus 120 and the second storage apparatus 130 operate in the host computer.

Incidentally, the present invention is not limited to the above-described embodiments and includes various modifications. For example, the above-described embodiments have been described in detail in order to describe the present invention in an easily understandable manner, and are not necessarily limited to those including the entire configuration that has been described above. In addition, some configurations of a certain embodiment can be substituted by configurations of another embodiment, and further, a configuration of another embodiment can be also added to a configuration of a certain embodiment. In addition, addition, deletion, or replacement of other configurations can be applied alone or in combination for a part of the configuration of each embodiment.

In addition, a part or all of each of the above-described configurations, functions, processing units, processing means, and the like may be realized, for example, by hardware by designing with an integrated circuit and the like. In addition, each of the above-described configurations, functions, and the like may also be realized by software by causing a processor to interpret and execute a program for realizing each of the functions. Information such as programs, tables, and files that realize the respective functions can be installed in a recording device such as a memory, a hard disk, and a solid state drive (SSD), or a recording medium such as an IC card, an SD card, and a DVD.

In addition, only control lines and information lines considered to be necessary for the description have been illustrated, and all of the control lines and information lines required as a product are not necessarily illustrated. It may be considered that most of configurations are practically connected to each other.

The invention claimed is:

1. A computer system comprising: a first computer; a second computer; a management computer; a first storage apparatus; and a second storage apparatus,
    wherein a first logical device of the first storage apparatus and a second logical device of the second storage apparatus constitutes a first remote copy pair configured to facilitate remote copy operations from the first logical device to the second logical device,
    the second logical device and a third logical device have virtual IDs to be recognized by an issuer of an I/O request,
    the first computer writes data to the first logical device and operates as a primary site, and the data written to the first logical device is written to the second logical device by the first remote copy pair,
    the second computer and the third logical device of the second storage apparatus perform a test failover as a secondary site, in which a third logical device copy the second logical device which is the same as the first logical device and the second computer operates the same operation same as the first computer and writes data to the third logical device,
    when the second computer takes over the first computer, the second storage apparatus receives a predetermined command as a trigger while processing the I/O request from the issuer of the I/O request to the third logical device, restores differential data from the third logical device to the second logical device and then interchanges the virtual IDs of the third logical device and the second logical device thereby switching an access destination of the issuer of the I/O request from the third logical device to the second logical device,
    the second storage apparatus implements a third remote copy pair by reversing a copy direction of the first remote copy pair, wherein the third remote copy pair facilitates performance of remote copy operations from the second logical device to the first logical device after interchanging the virtual IDs of the third logical device and the second logical device in order to show via the third remote copy pair a data update accepted by the second logical device according to the I/O request, and
    the second computer writes data to the second logical device, and the data written to the second logical device is written to the first logical device by the third remote copy pair.

2. The computer system according to claim 1, wherein the second storage apparatus queues the I/O request while interchanging the virtual IDs.

3. The computer system according to claim 2, wherein the second storage apparatus ends the queuing of the I/O request after interchanging the virtual IDs of the third logical device and the second logical device.

4. The computer system according to claim 1, wherein the second storage apparatus implements a remote copy operation from the third logical device to the second logical device after interchanging the virtual IDs of the third logical device and the second logical device.

5. A method for controlling a storage apparatus that causes a computer system including a first computer, a second computer, a management computer, a first storage apparatus, and a second storage apparatus to control the first storage apparatus and the second storage apparatus, the method comprising:
    a first step of causing the management computer to set a first remote copy pair of a first logical device of the first storage apparatus and a second logical device of the second storage apparatus, the first remote copy pair configured to facilitate remote copy operations from the first logical device to the second logical device;
    a second step of causing the second storage apparatus to set virtual IDs of the second logical device and a third logical device to be recognized by an issuer of an I/O request, the first computer writes data to the first logical device and operates as a primary site, and the data written to the first logical device is written to the second logical device by the first remote copy pair, the second computer and the third logical device of the second storage apparatus perform a test failover as a secondary site, in which a third logical device copy the second logical device which is the same as the first logical device and the second computer operates the same operation same as the first computer and writes data to the third logical device; and
    when the second computer takes over the first computer, a third step of causing the second storage apparatus to receive a predetermined command as a trigger while processing the I/O request from the issuer of the I/O request to the third logical device, to restore differential data from the third logical device to the second logical device and then interchange the virtual IDs of the third logical device and the second logical device, thereby switching an access destination of the issuer of the I/O request from the third logical device to the second logical device,
    wherein the second storage apparatus implements a third remote copy pair by reversing a copy direction of the first remote copy pair, wherein the third remote copy pair facilitates performance of remote copy operations from the second logical device to the first logical device after interchanging the virtual IDs of the third logical device and the second logical device in the third step in order to show via the third remote copy pair a data update accepted by the second logical device according to the I/O request, and wherein the second computer writes data to the second logical device, and the data written to the second logical device is written to the first logical device by the third remote copy pair.

6. The method for controlling a storage apparatus according to claim 5, wherein
the second storage apparatus queues the I/O request while interchanging the virtual IDs in the third step.

7. The method for controlling a storage apparatus according to claim 6, wherein
the second storage apparatus ends the queuing of the I/O request after interchanging the virtual IDs of the third logical device and the second logical device in the third step.

8. The method for controlling a storage apparatus according to claim 5, wherein
the second storage apparatus implements a remote copy operation from the third logical device to the second logical device after interchanging the virtual IDs of the third logical device and the second logical device.

* * * * *